| NAME SECTION | DESCRIPTION | ADDRESS | TELEPHONE NUMBER |
|---|---|---|---|
| 1) 123 BALL GEO /ATTY/ | | 183 JUSTIN | HI 6-3000 |
| 2) | Ball Geo atty 183Justin | --------- | HI 6-3000 |
| 3) 183 JUSTIN | | 183Justin | |
| 4) 183 JUSTIN RD | | 183JustinRd | |
| 5) 183 IOWA | | 183 Iowa | |
| 6) 183 N JUSTIN RD | | 183 N JustinRd | |
| 7) 183 W 13 AV | | 183 W 13Av | |
| 8) 183 13TH | | 183 13th | |
| 9) 183 13TH AV | | 183 13thAv | |
| 10) 183 13TH NE | | 183 13thNE | |
| 11) 183 JUSTIN-PAGE-CAMP DR | | 183 Justin-Page-Camp-Dr | |
| 12) RR 1 MCHNCSBRG | | RR1Mchncsbrg | |
| 13) BALL GEO /CPA/ | | Ball Geo CPA | |
| 14) BALL GEO /MD/ | | Ball Geo MD | |
| 15) GEORGE,S GARAGE | | George's Garage | |
| 16) O,BRIEN,S GARAGE | | O'Brien's Garage | |
| 17) MACDONALD GEO | | Macdonald Geo | |
| 18) MAC DONALD GEO | | MacDonald Geo | |

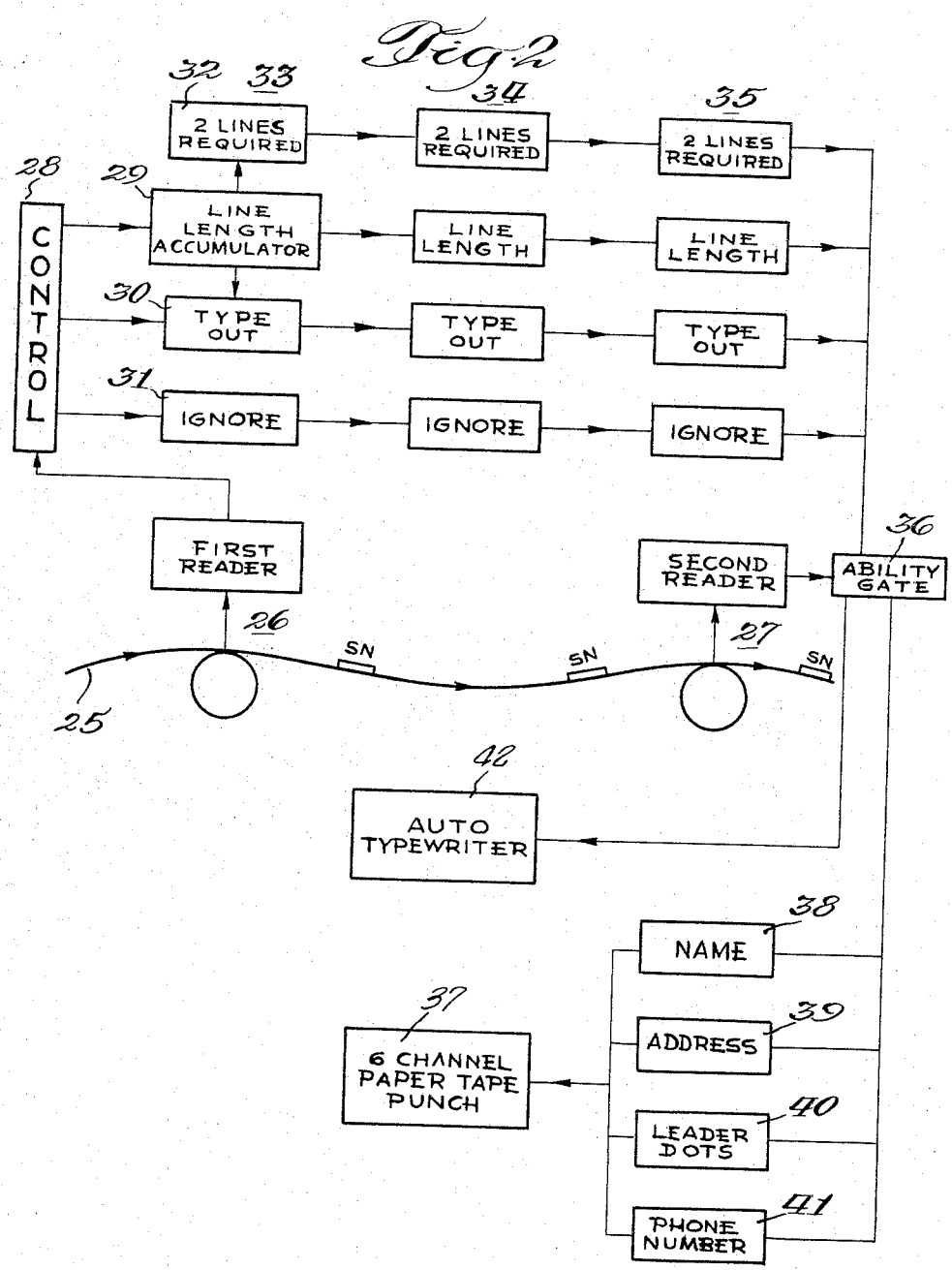

Fig. 3

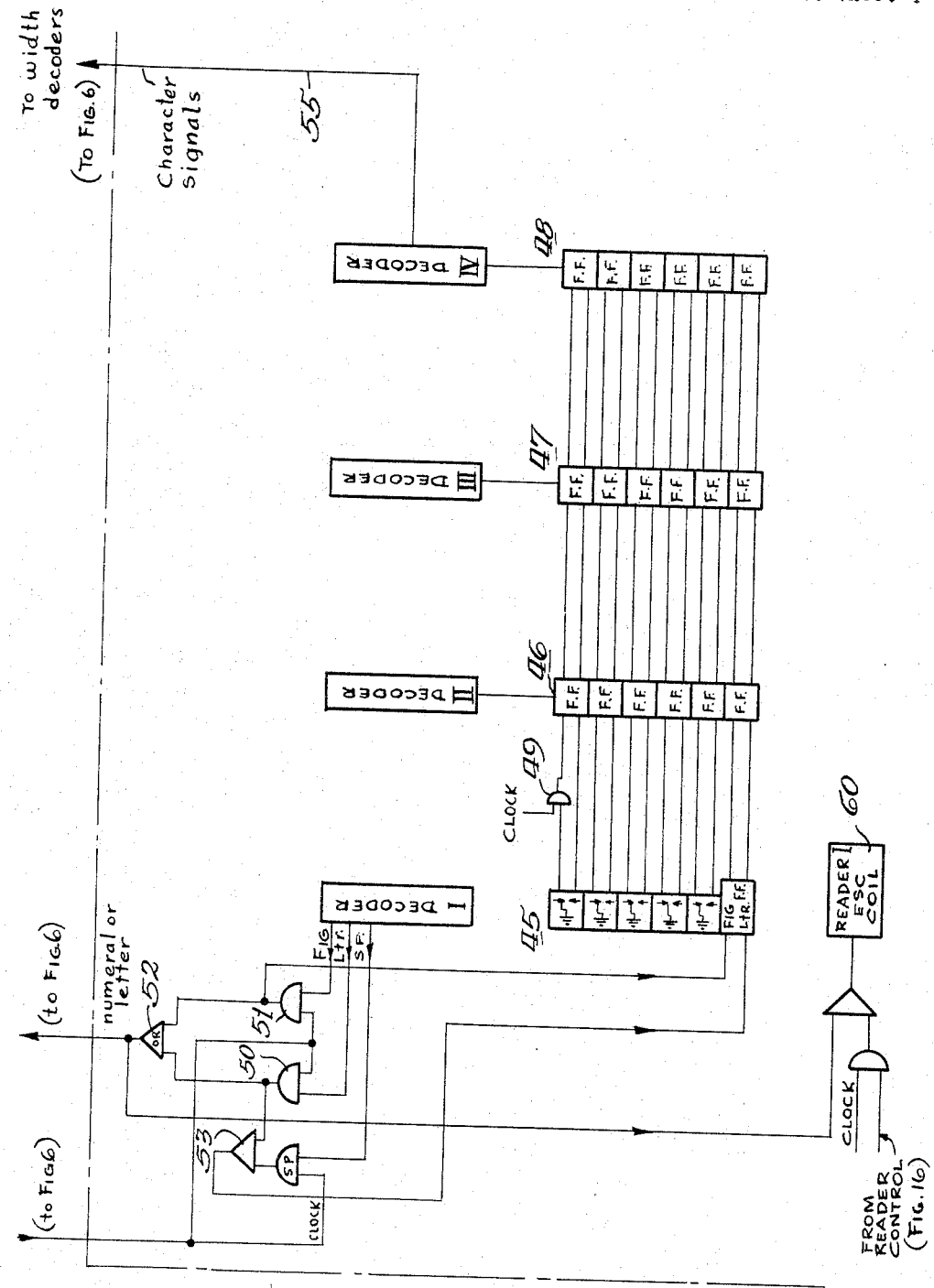

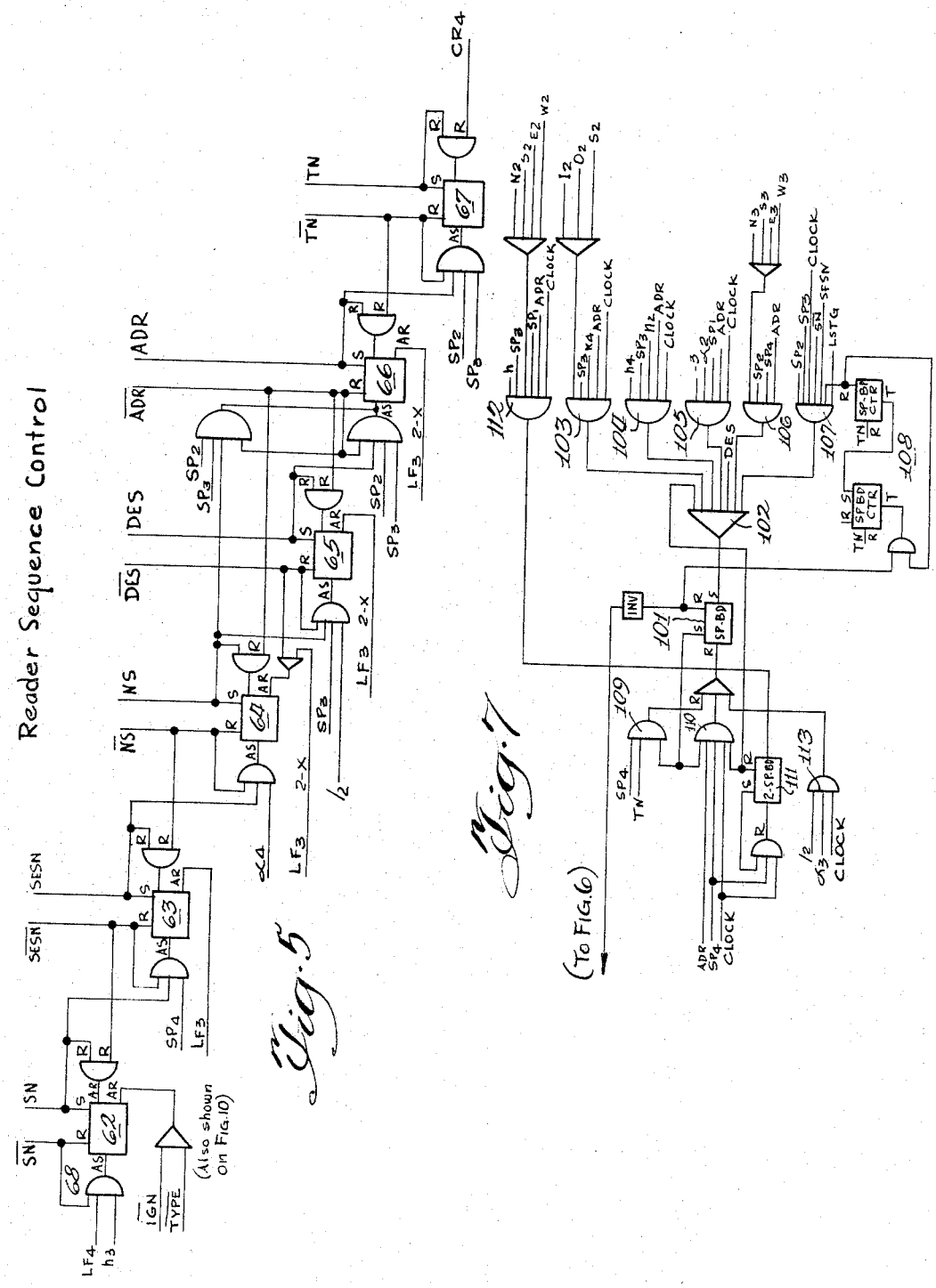

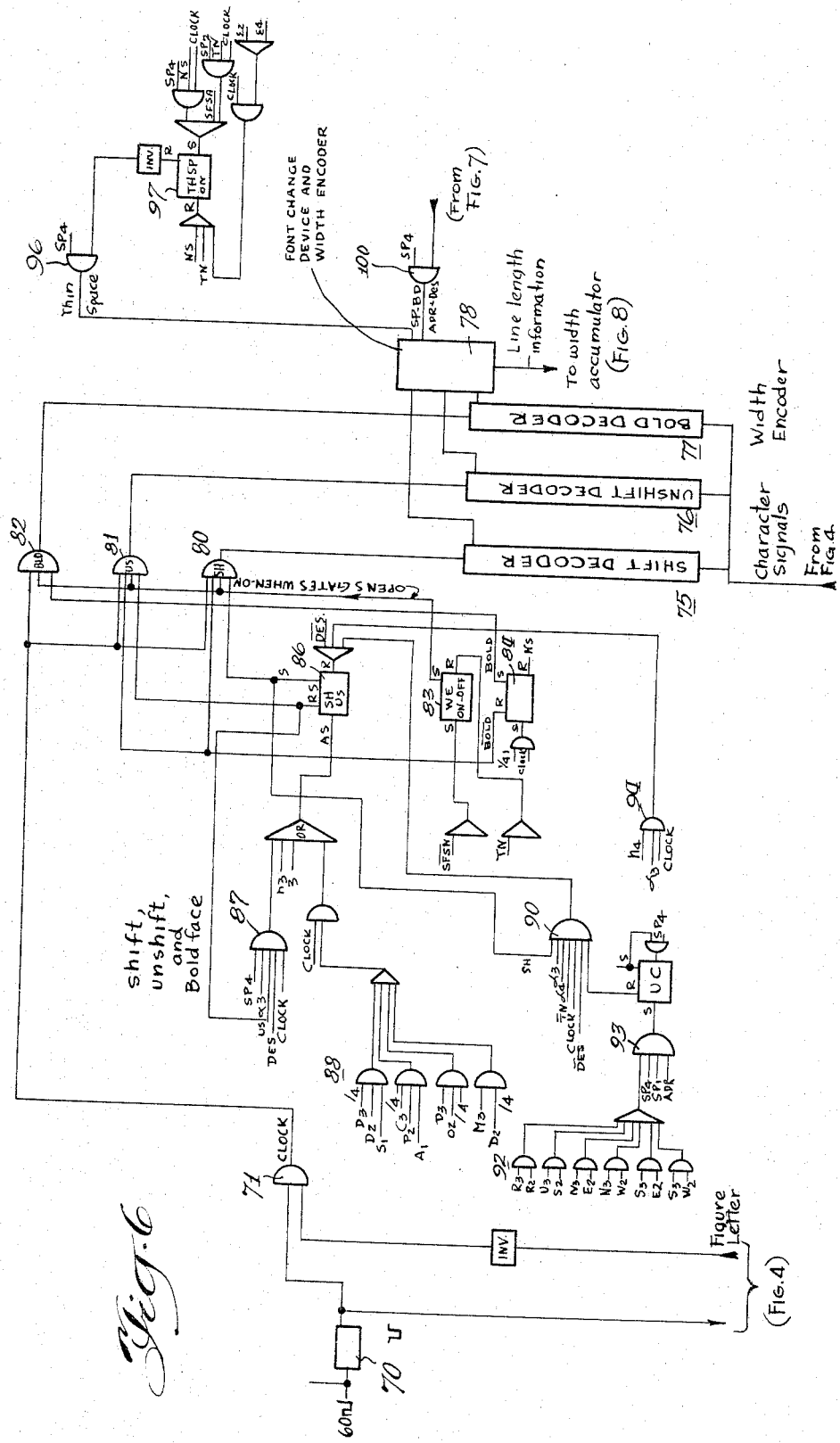

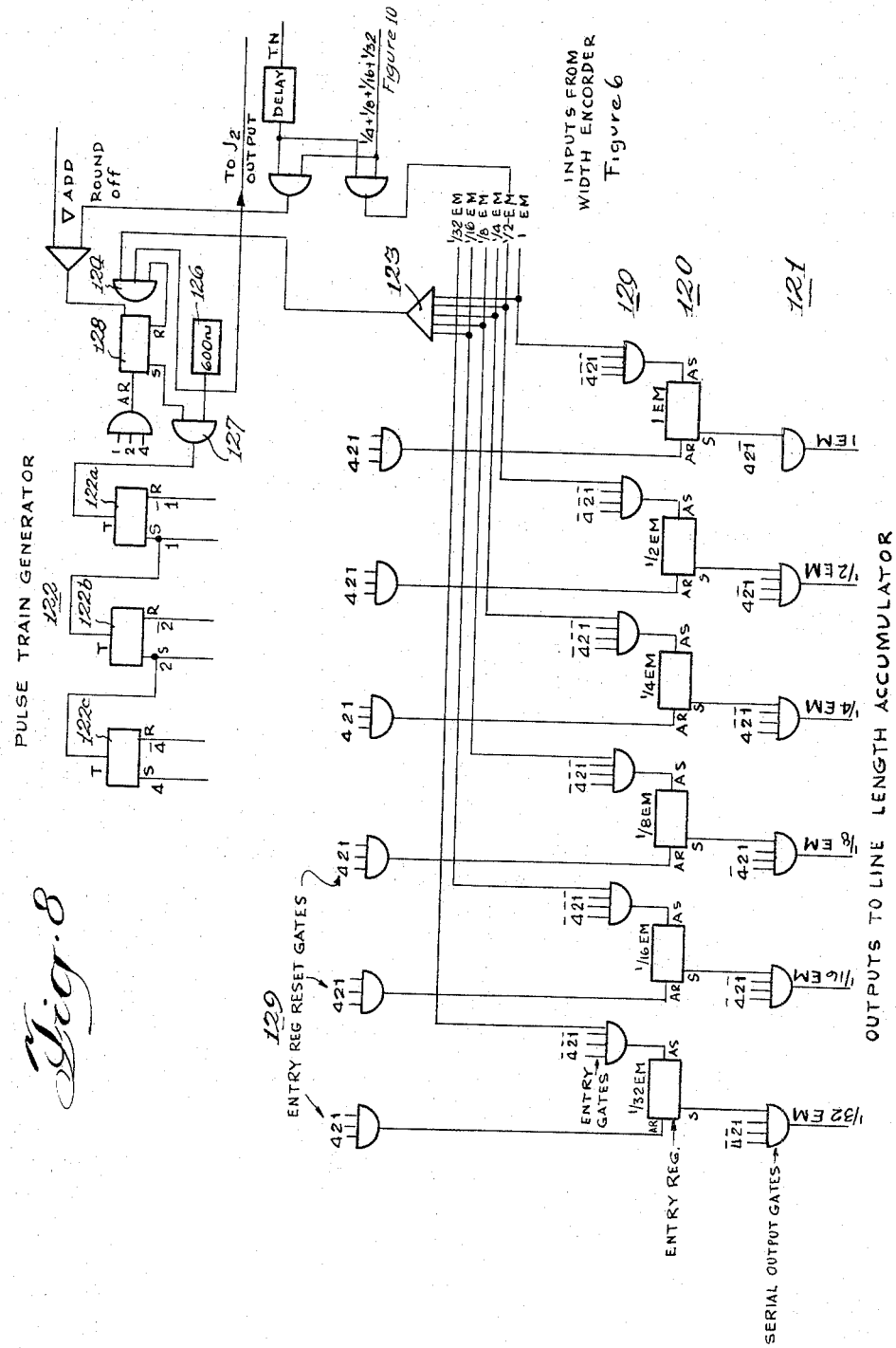

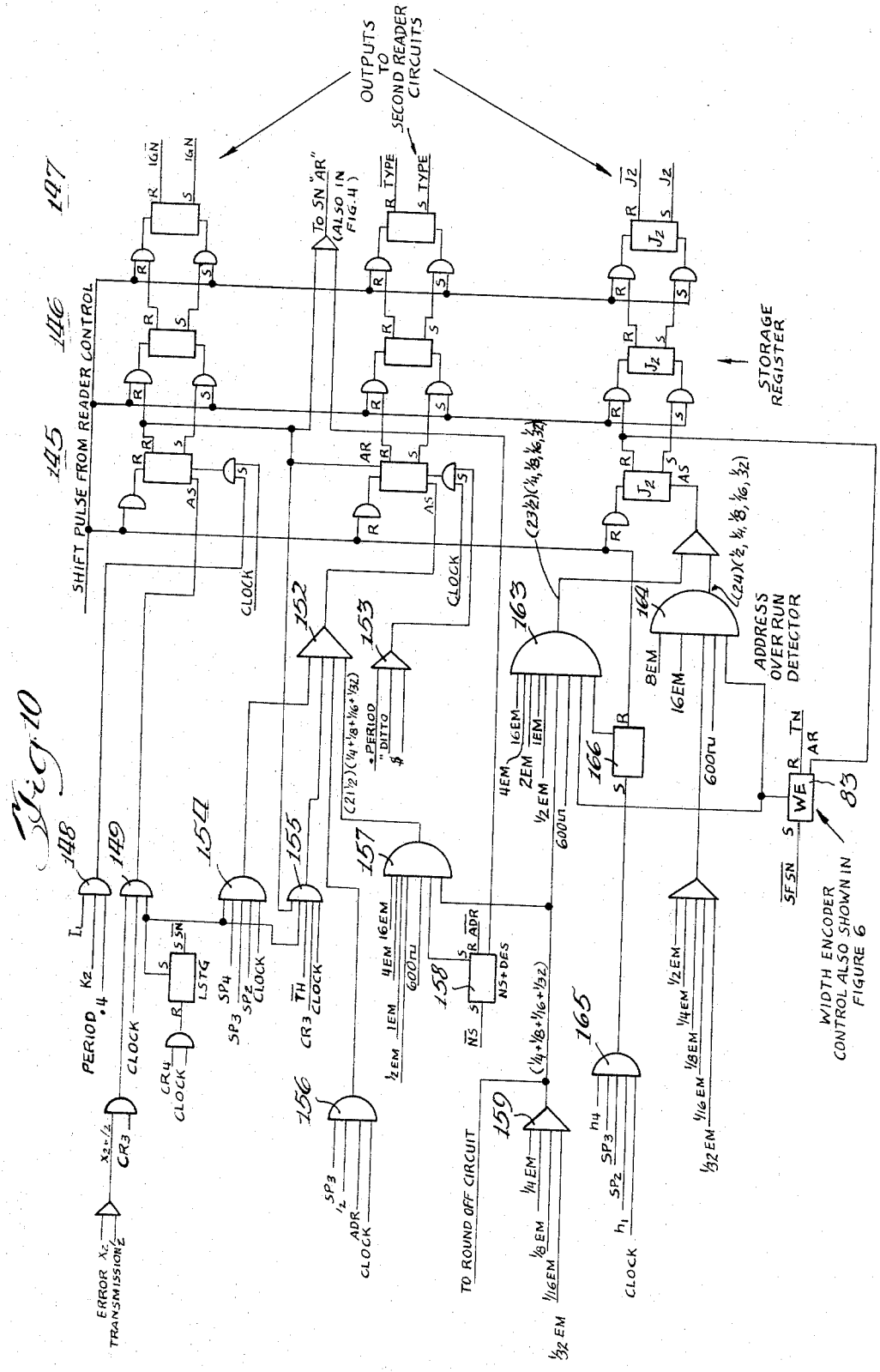

Aug. 22, 1967  J. W. GRANT ETAL  3,337,686
AUTOMATIC TYPESET MACHINE CONTROL
Filed Sept. 20, 1963  16 Sheets-Sheet 10

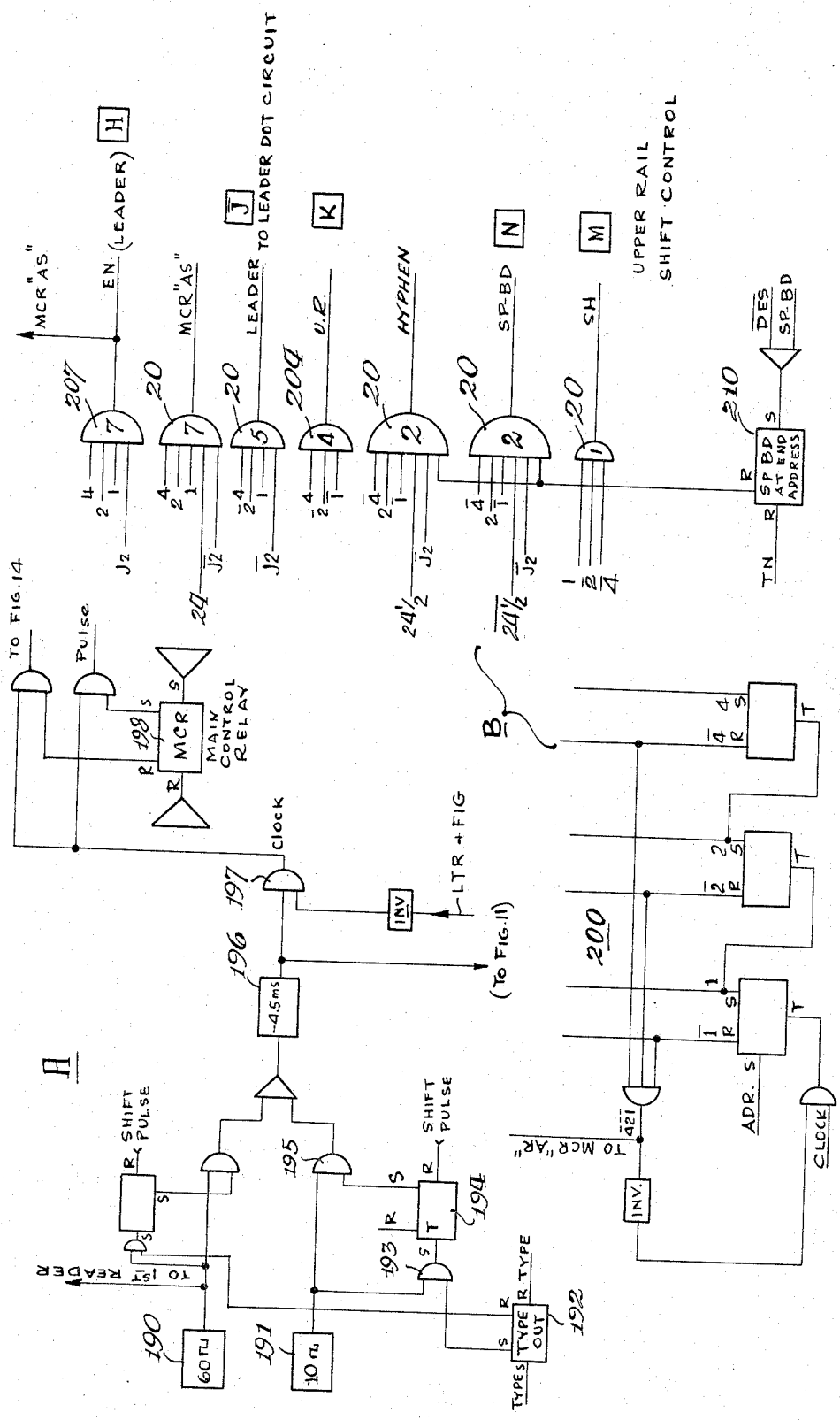

Fig. 13

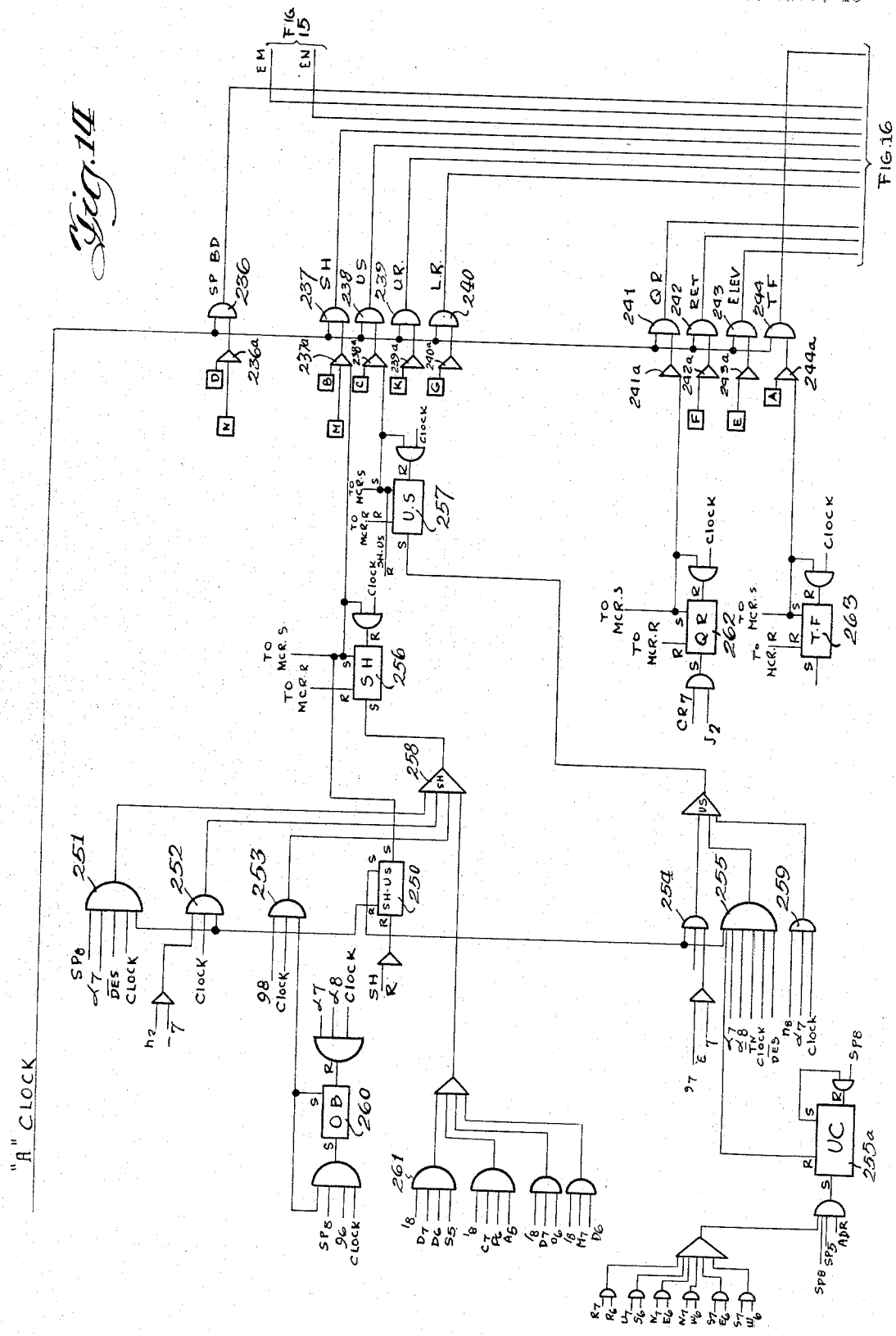

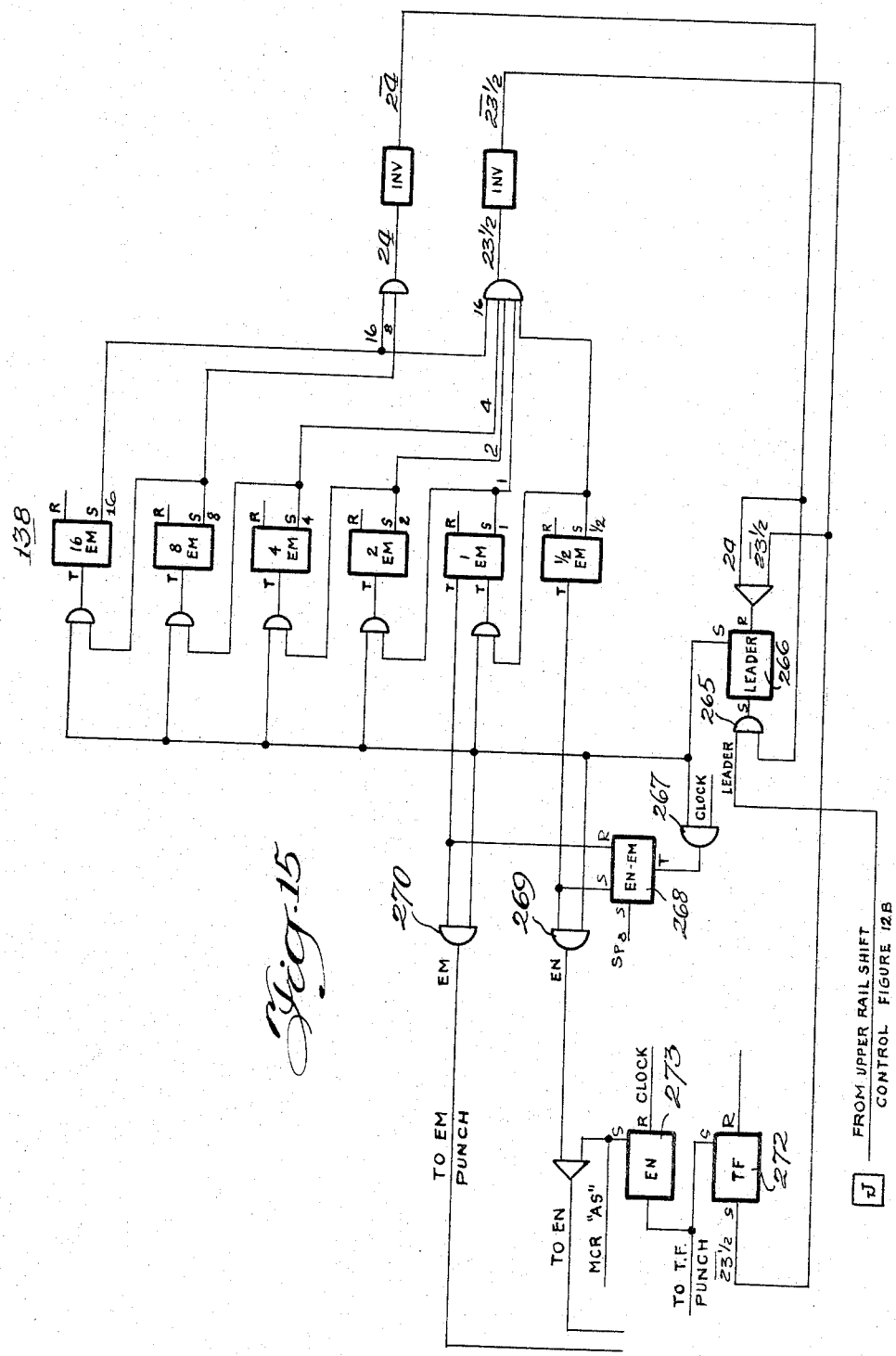

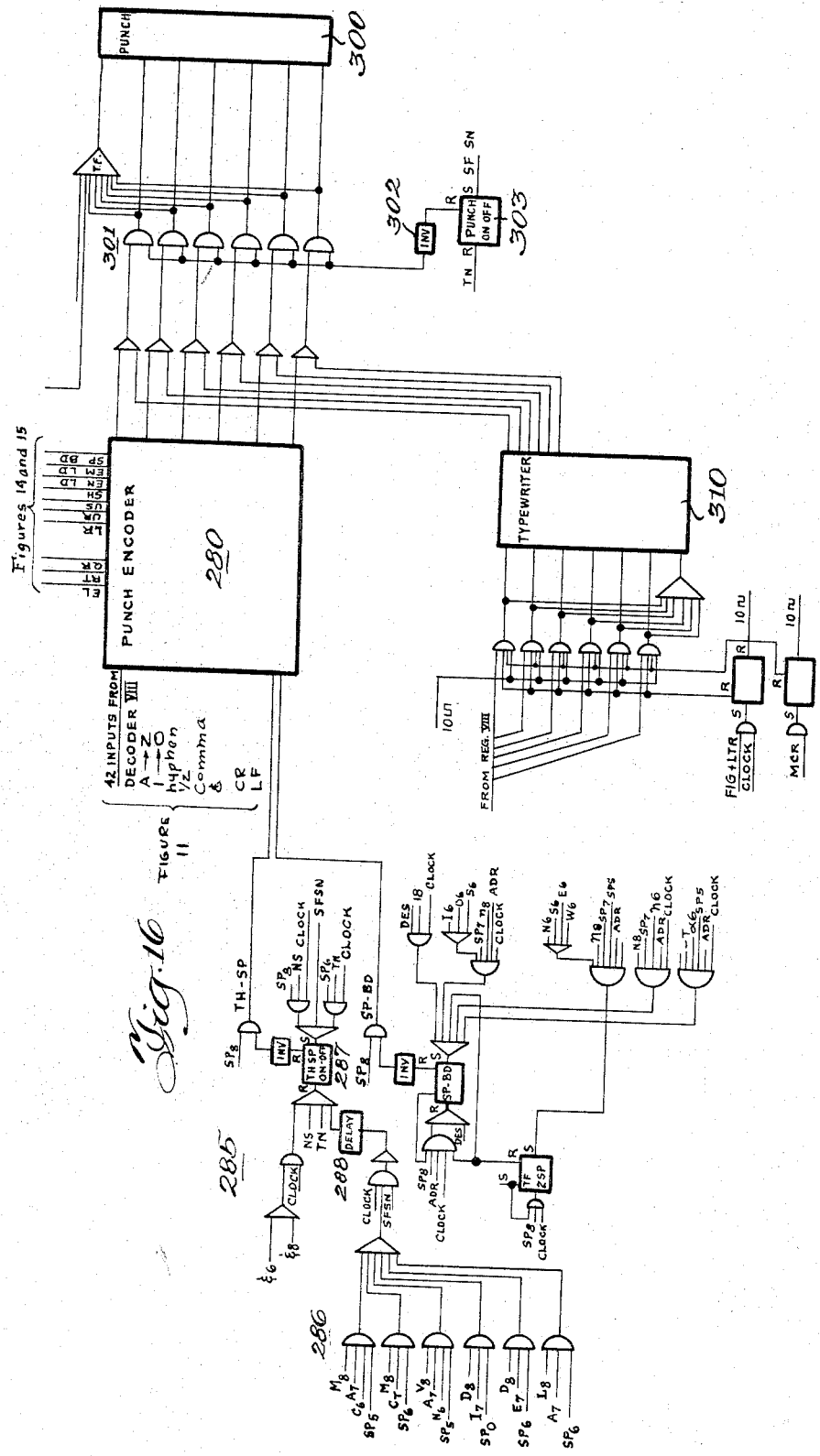

United States Patent Office 3,337,686
Patented Aug. 22, 1967

3,337,686
AUTOMATIC TYPESET MACHINE CONTROL
John W. Grant, Wheaton, and John E. Kleboe, Chicago, Ill., assignors to R. R. Donnelley & Sons Company, a corporation of Delaware
Filed Sept. 20, 1963, Ser. No. 310,282
22 Claims. (Cl. 178—23)

ABSTRACT OF THE DISCLOSURE

An automatic typeset machine control for printing directory listings having a plurality of characters of different types and a plurality of sections, including a source of input signals representative of the characters in the form of a single type, means for translating the character representative input signals into corresponding typeset machine control signals, means for simultaneously sensing characteristics of a plurality of the input signals and means responsive to the sensed characteristics for controlling the type of the typeset machine control signals.

Background of the invention

This invention relates to a typeset machine control and more particularly to a control responsive to information representing characters of one type for setting characters of several types.

The embodiment of the invention disclosed herein is designed for and has certain features particularly adapted for the control of a typeset machine in setting telephone directory listings from listing information transmitted by Teletype. Other features of the invention are usable in effecting other information conversions.

It is a present practice to transmit information regarding new telephone listings and listing changes from a large area to a central office where directory supplements for each locality in the area are printed. Directory listing information for each community is transmitted by Teletype to the central office. Trained operators translate the Teletype information to control the typesetting for printing the directory supplements. This may be done by preparing a punched control tape for a Linotype machine, or by directly operating the Linotype. The control system of the present invention performs the central office information translation operation automatically, reducing the requirement for skilled Linotype or punch operators and carrying out the translation operation more rapidly than can be done manually.

Teletype information is transmitted by a five-channel code which is capable of identifying the 26 letters of the alphabet, ten numerals and a limited number of symbols. The transmissions are made solely in upper case or capital letters. In the Teletype transmission, one code group can represent either a letter or a numeral (or other character). Two code groups, one indicating letters (Ltr) and the other figures (Fig) indicate the nature of a following transmission. The transmission automatically returns to Ltr after a space. The standard Linotype tape control utilizes a six-channel code and has provision for upper and lower case letters in standard face, bold face and light face type and utilizes some characters not transmittable by Teletype. A typical telephone directory listing is divided into sections with the name followed by a designation, as doctor, attorney, plumber, or the like, where appropriate, the address and the telephone number. The name and telephone number are set in standard type while the designation and address are set with light face. Certain special listings are set in bold face type. Some designations are by custom displayed in capital letters while others are lower case. Directories are printed with the listings arranged in rather narrow columns having both the left and right margins vertically aligned (except for specially indented lines). Leader dots are inserted between the end of the address and the telephone number to provide a filled line for each single line listing. In some cases, the name and address or even the name alone occupy so much of the line that the listing must be made on two lines. The name is set on one line and the address and telephone number are placed on the second line. A problem is encountered, however, where the name alone is too long, and must be split. This operation is best performed manually to insure that the name is correctly divided.

Summary of the invention

One feature of the invention is the provision of a control which will accomplish the conversion from coded Teletype input to a coded output signal for controlling the Linotype machine to set directory listings. The control further analyzes the incoming information and makes the editorial controls necessary to provide the complete listing in the proper form and using the proper type face, from the single character incoming information. Listings which cannot be handled automatically, as those with a name overrun, are rejected and set manually.

More specifically, a feature of the invention is the provision of a typeset machine control including a source of input signals representing the characters of a listing and being divided into a plurality of groups corresponding with the sections of the listing, means for translating the input signals into corresponding character representative typeset machine control signals, means for sensing a characteristic of the input signals and means responsive to said sensed characteristic for controlling the character representative control signals.

Another feature is that the machine control includes means for sensing the grouping of the input signals and for controlling the control signals in accordance therewith.

A further feature is that the control includes means for sensing a predetermined plurality of sequential character signals and for controlling the control signals in accordance therewith.

Yet another feature is that the machine control includes a first reader responsive to the received signals for analyzing characteristics of the listing and for determining the disposition thereof, a second reader responsive to the received signal and to the first reader for coupling the signals to a means for translating the signals into typeset machine control signals or to a means for translating the signals into a typed copy. The listings which cannot be handled automatically are typed and later punched into tape manually.

Still a further feature is that the first reader has a sequential control circuit with an output signal corresponding with each section of the transmitted listing sections, and means for totaling the width of characters in the listing. A circuit responsive to character width total less than a predetermined maximum directs the signals to the typeset translation means, and a circuit responsive to the name section signal and a character width total exceeding a predetermined maximum directs the signals to a typewriter.

Another feature is that the control includes a multiple section character storage register, and a reader sequence control, the control comprising a series of bistable circuits having inputs and outputs with gate circuits connected between the storage register and the bistable circuit inputs for actuating the bistable circuits in accordance with predetermined combinations of characters in the storage register. In addition, the reader sequence control bistable circuits are sequentially interconnected in a cascade circuit so that each, except the first, is actuated only after actuation of a preceding bistable circuit.

Yet a further feature is that the control includes a first reader for deriving control information, a second reader for translating the input signals in accordance with the control information from the first reader, a plurality of storage registers for the control information and means responsive to a condition of each of the readers for controlling both readers and the transfer of information through the storage register.

And another feature is the provision of means responsive to the character width totalizing circuit for inserting leader dots between the address and telephone number section to justify each listing.

Further features will be apparent from the following specification and from the drawings.

Description of the drawings

FIGURE 2 is a block diagram illustrating the general operation of the machine control;

FIGURE 3 is an illustration of various five-channel Teletype information and the corresponding telephone directory entries;

FIGURE 4 is a block diagram of the first reader storage circuit;

FIGURE 5 is a block diagram of the first sequence control;

FIGURE 6 is a block diagram of a portion of the first reader circuitry including the font change control;

FIGURE 7 is a block diagram of the first reader address, and designation space control;

FIGURE 8 is a block diagram of the character width information parallel-to-serial converter;

FIGURE 10 is a block diagram of derivation circuits for special condition second reader controls;

FIGURE 11 is a block diagram of the second reader storage and sequence control;

FIGURE 12A is a block diagram of the second reader clock and main control relay;

FIGURE 12B is a block diagram of the rail shift control;

FIGURE 13 is a block diagram of the font shift control;

FIGURE 14 is a block diagram of the punch encoder input circuits;

FIGURE 15 is a block diagram of the leader dot circuit;

FIGURE 16 is a block diagram of the space control and punch encoder circuits;

FIGURE 17 is a block diagram of an auxiliary tape feed control circuit; and

Detailed description

Figure 1:
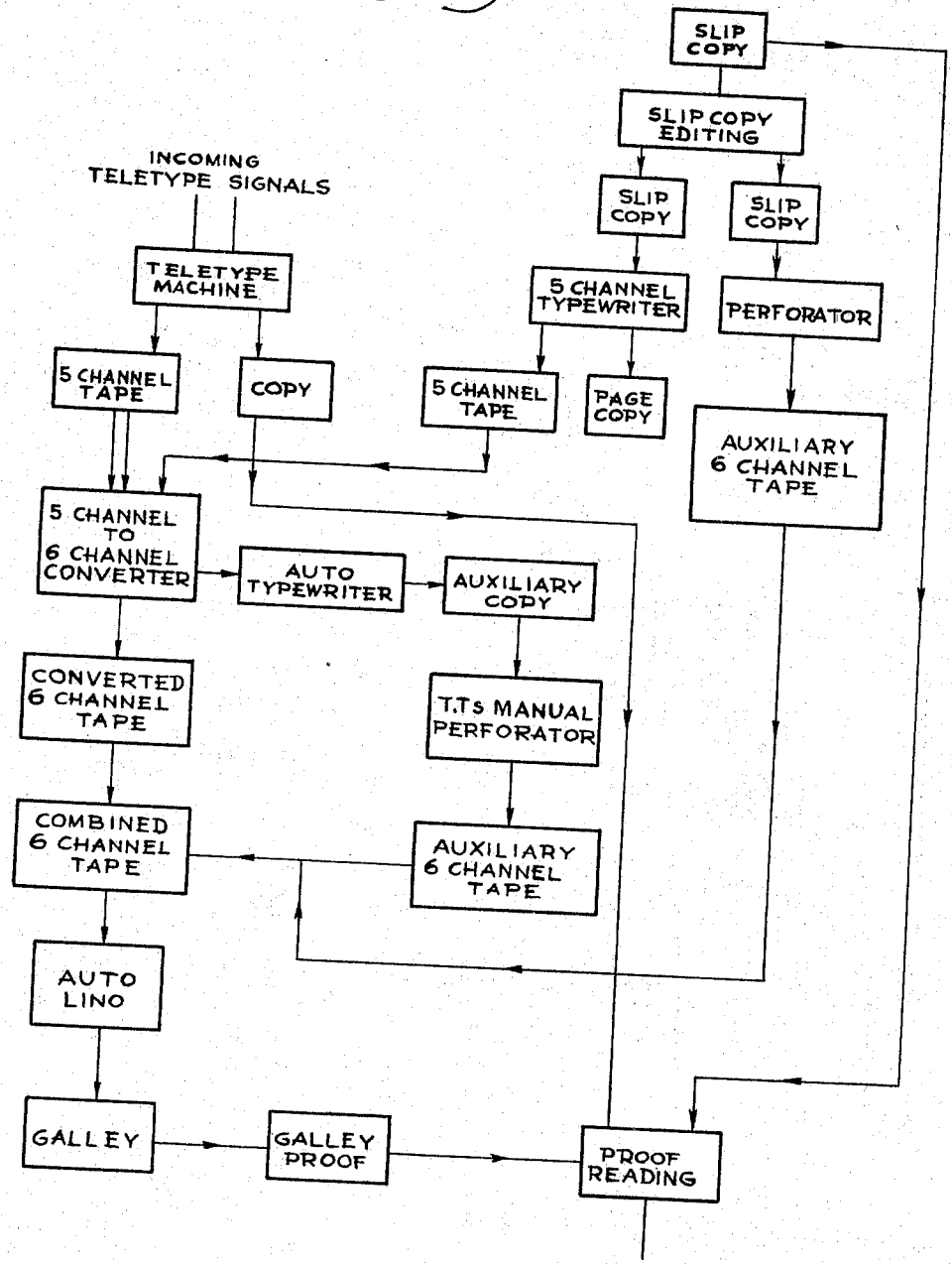
FIGURE 1 is a block diagram of the information handling operation for producing printed telephone listings, and including the automatic machine control.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. The scope of the invention will be pointed out in the appended claims.

The control system of this invention utilizes digital data handling circuitry including storage registers, bistable multivibrators or flip-flop circuits, and "AND" and "OR" gates. The operation of the system is synchronized by a control oscillator or clock. In the drawings, the flip-flop or bistable multivibrator circuits are indicated by rectangles; the "AND" gates by semi-circles and the "OR" gates by triangles. These circuits are well known in the art and will not be disclosed in detail.

The flip-flop circuits have Set (S) and Reset (R) conditions with two outputs which shift between −12 v. and 0 v. or ground with a change of flip-flop condition. The flip-flops reverse condition with an appropriate input shift from −12 v. to 0 v. If the circuit is in the Set condition, an input to the Reset terminal is required for a shift to Reset condition. Similarly, if the circuit is in the Reset condition, a Set input will cause a shift to the Set condition.

In the drawings and specification, certain letter abbreviations and symbols will be used. These abbreviations and symbols and their meaning are listed in the following table:

| | |
|---|---|
| ADR | Address. |
| AR | Automatic reset. |
| AS | Automatic set. |
| CR | Carriage return. |
| DES | Designation. |
| ELEV | Elevate. |
| IGN | Ignore. |
| INV | Inverter. |
| J | Address overrun. |
| LD | Leader dot. |
| LF | Line feed. |
| LR | Lower rail. |
| MCR | Master control relay pulse. |
| $n$ | Numeral. |
| NS | Name section. |
| QR | Quad right. |
| R | Reset. |
| RET | Return. |
| S | Set. |
| SFSN | Space following serial number. |
| SH | Shift. |
| SN | Serial number. |
| SP | Space. |
| SP–BD | Space band. |
| TF | Tape feed. |
| TH–SP | Thin space. |
| TN | Telephone number. |
| Type | Type out. |
| UR | Upper rail. |
| US | Unshift. |
| WE | Width encoder. |
| $\alpha$ | Alphabetic character. |

Turning now to the drawings, and more particularly to FIGURE 1, the over-all sequence of directory production is shown in block form. Incoming Teletype signals from the various communities in the area covered by the central office are connected with a Teletype machine which produces both a five-channel tape and a Teletype copy. The five-channel tape is connected with the five-channel to six-channel converter of the invention which produces a six-channel tape of those listings which can be handled automatically. The other listings, as those with a name overrun or special instructions requiring manual handling, are directed to an automatic typewriter which produces auxiliary copy. A manual perforater is utilized to produce an auxiliary six-channel tape which is combined with the six-channel tape from the converter to yield a combined six-channel tape which controls the automatic Linotype machine. Galley from the automatic Linotype is prepared and a proof copy pulled. This is proofread with the copy from the Teletype machine.

Some listing information may come to the central office in the form of slip copy, i.e., written information concerning the listing, rather than a Teletype signal. The slip copy is edited and converted to a five-channel tape which is combined with the five-channel Teletype tape to the converter. Slip copy listings which cannot be handled by the automatic converter are separated in the editing stage and perforated manually, providing an auxiliary six-channel tape combined with the auxiliary tape from manually punched Teletype information.

The remainder of the specification will be concerned primarily with the five-channel to six-channel converter, shown in block form in FIGURE 2. However, before beginning the detailed description of the circuity, a brief consideration of the form of the Teletype information and of the listing will be helpful. Referring to FIGURE 3, line 1, a representative Teletype transmission is shown. The transmission starts with a serial number, here 123, followed by a double space. The name section includes the name of the listee, here "Ball Geo," with the two words separated by a single space. This listing includes a designation which, in the Teletype transmission, is separated from the name section by a single space and a slash mark. The designation, "ATTY," is followed by a slash mark and a double space preceding the address. In the address, the numerals are separated from the street name by a single space. The address is followed by a double space which separates it from the telephone number. In the telephone number the exchange letters, "HI," are followed by a single space and the numerals, "6-3000." In the Teletype transmission, spaces are treated as characters of the message, and have a set code signal, in the following discussion, use is often made of the space representing the signals. For this purpose, the spaces will be treated as characters of the received message although they are not technically characters.

The serial numbers are important in processing the Teletype information. In FIGURE 2, a punched tape 25 which has the five-channel Teletype signals punched therein, passes through a first reader 26 and to a second reader 27. The serial numbers, SN, for the listings are indicated diagrammatically on the tape 25 and indicate that while the first reader is reading a given listing, the second reader is reading the second preceding listing, with one listing in the space between the two readers. The effect of this intervening listing on the design of the control will be apparent as the description progresses. Information from the first reader is coupled with the control circuit 28 which has three major outputs, one to a line length accumulator 29, a second to a "Typeout" control signal storage register 30 and a third to an "Ignore" control signal register 31. Listings with special instructions include a typeout command sensed by the first reader. When an error has been made by the operator and recognized before transmission of the listing is completed, an ignore signal is transmitted. If the line length accumulator senses a name overrun, it provides a typeout command. If there is a name and address overrun so that a two-line listing is necessary, but can be programed automatically, a "2 lines required" signal is given. In the normal listings, the line length information is accumulated and provides a basis for insertion of leader dots in the Linotype machine.

The blocks 29–32 comprise the first stage of a multi-stage information storage register connected between the two readers. When the listing passing through the first reader is completed, the control information in first storage register 33 is transmited to corresponding sections of the storage register 34. As the tape enters the second reader, the control information shifts to the third stage 35 of the storage register in which it controls ability gate 36. The character information from the second reader is coupled through the ability gate either to the six-channel tape punch 37 or to an automatic typewriter 42, if a "typeout" signal has been received. "Ignore" listings are disregarded. Between the ability gate 36 and punch 37 are gates 38, 39, 40 and 41 corresponding respectively with the name, address, leader dot and phone number sections of the listing. Additional control information must be incorporated in the Linotype control tape to secure the proper type face and other characters. Gates 38–41 contribute to this control information.

Returning now to FIGURE 3, the telephone directory entry for the listing of line 1 is shown on line 2 and addresses and names which require special handling are illustrated. It will be noted that the serial number is eliminated and the initial letters only of the name are capitalized. The name is set in standard type. The designation indicators (slash marks of the Teletype transmission) are eliminated and the designation is set in lower case, light face type. Some designations, however, are set in capital letters. This is handled automatically by the machine control, as will appear. In the address, the space between the numeral and the street name is eliminated, although this practice may vary in different localities and with certain combinations of letters and numerals. The street name initial letter is capitalized while the remainder of the name is set lower case; and again, light face type is used. The telephone number is justified with the right margin of the column, and the space between the address and the telephone number is filled with leader dots. The telephone number is set in standard type.

Line 3 illustrates the handling of the address section of the listing of line 1. The space between the numeral and the street name is eliminated ("closed up address") and the letters, other than the initial letter of the street name are set in lower case light face type.

The remainder of FIGURE 3 provides examples of the Teletype transmission and corresponding directory entry for several different forms of name and address. The directory style may, of course, be varied.

Line 4 illustrates an address with two words. Here, in the Teletype transmission, the designation RD is spaced from the street name. In the directory entry, this space is eliminated. However, even in a "closed-up address" directory, an exception is made in addresses having an initial letter which might be mistaken for a numeral. In line 5, the handling of an address "183 Iowa" is illustrated. In the Teletype transmission, the numeral and name are spaced as in other address transmissions, and in the directory a space is left between the numeral and the initial letter of the street name.

Line 6 illustrates the handling of directional letters. Here the directional letter N (denoting north) is spaced from the number and street name in the Teletype transmission. In the directory entry, both spaces are retained. In line 7, it is seen that "W 13 AV" of the Teletype transmission is set "W 13Av" in the directory. Lines 8 through 10 show variations encountered with numbered streets having ordinal numerals. In line 8, "13TH" is set "13th." Line 9 illustrates "13TH AV" set as "13thAv." A directional designation is always capitalized as shown in line 10. Here both letters of the directional "NE" are capitalized, although it follows the street number "13th."

Line 11 illustrates a compound street name with the various sections of the name separated by hyphens. The initial letter of each section is capitalized.

For a rural route address (line 12), the Teletype message has the route number spaced from the symbol RR and the name of the town spaced from the route number. In the directory listing, this is printed in closed up form, with the letters RR capitalized and the initial letter of the town capitalized.

Examples of name designations are given in lines 13 and 14. In this case, both designations are printed in capital letters in the directory, as contrasted with the lower case designation of line 2.

The apostrophe character is transmitted by Teletype as a comma and the machine control is programmed to translate commas as apostrophes. If a comma is required in a listing, a special instruction must be sent. In line 15, the handling of the apostrophe in "George's" is illustrated.

In line 16, a compound name "O'Brien" is shown. Again, the apostrophe in the name is transmitted as a comma. It should be noted that the letter B of O'Brien is set as a capital although it is not the initial letter of the word. The transmission in this case, however, has the word "O'BRIEN" closed up.

Automatic handling can also be secured for variations of the word "MACDONALD." In line 17, the Teletype transmission is "MACDONALD" and the directory listing is "Macdonald." In line 18, the Teletype transmission is MAC DONALD and the directory listing is MacDonald.

The specific multiple-capital names are merely illustrative. Many similar names are handled in the same manner.

Other variations are, of course, possible, but are of so infrequent occurrence that they are better handled by special instructions, with a typeout order.

In preparing the control tape for the typesetting or Linotype machine, in addition to the signals for the individual characters, i.e., letters, numerals and spaces, it is necessary to provide control signals for the selection of type face. Shift and unshift signals control the selection of capital and lower case letters. Upper and lower rail and upper and lower magazine signals control selection of the type font (standard, light face or bold face). Elevate and return signals control the line makeup of the directory.

The first reader, which will be described next, has a primary function of ascertaining the length of the listing and detecting the transmission of special instructions to provide a control over the disposition of the listing by the second reader. The line length measurement of the first reader is also utilized to control the insertion of leader dots in punching the Linotype control tape.

In the sensing section of the first reader, FIGURE 4, section I comprises five double-throw switches 45, one for each of the five channels of the incoming Teletype tape. Decoder I is connected with the character sensing switches and comprises a series of "AND" gates arranged to detect the Teletype code. Outputs from the decoder I indicate the presence of specific characters in the first stage of the reader and are used as controls for other operations of the reader. In addition to outputs for each individual character, outputs are derived representing the presence of a letter (Ltr.), figure (Fig.) and space (Sp) control signal code groups.

Three sets of bistable flip-flop circuits or storage registers 46, 47 and 48 form sections II, III and IV of the first reader. Information from the switches of section I is transmitted in parallel to section II, from II to III and from III to IV, as the tape is read. This transfer is controlled by "AND" gates synchronized with the output of a "clock" control circuit. Only one of the "AND" gate circuits 49 is illustrated to avoid unnecessary complication of the drawing.

Interspersed with the character codes of a listing are letter and figure code signals which indicate whether the following code groups designate letters or figures (i.e., numerals). The information in these code groups should not be passed through the reader sections as are the character codes. It is necessary, however, to store this information so that each code group in the reader may properly be identified, and to step the reader escapement coil. Figure and letter outputs are derived from decoder I and coupled to AND gates 50 and 51. The output of these two AND gates is connected through OR gate 52 and to the reader escapement coil 60. The output of gate 52 is also utilized in FIGURE 6 to inhibit the clock output during the code signal as will appear.

A sixth channel of each of the storage registers 45 through 48 indicates whether a figure or letter character is present. The flip-flop sixth channel of storage register 45 has a FIG input connected with the output of AND gate 50. A space signal (SP) is combined with LTR in OR gate 53 and provides the LTR input for the flip-flop. In Teletype transmission, there is an automatic return to the letter condition following a space.

Decoders II, III and IV are connected with storage registers 46, 47 and 48, respectively, and provide character information regarding the signals stored in each register. The character information is utilized in other controls for the circuit and will be designated by the abbreviations given above an Arabic numeral subscript to indicate the register section at which the information appears. For example, $SP_3$ means a space in section III, $LF_4$ means a line feed signal in register IV and $n_2$ means a numeral in section II.

The output from storage register 48 which comprises individual character signals is coupled through line 55 to the width decoders (FIGURE 6).

The tape is driven through the first reader by an escapement coil 60 actuated normally by a 60 cycle clock signal and the reader control (FIGURE 16). A Fig. or Ltr. control signal also steps the reader, as explained above.

A first reader sequence control (FIGURE 5) senses the section of the listing which is passing through the reader and provides control signals indicating the presence and absence of particular sections. These control signals are utilized, along with the character signals from the four storage register and decoders in controlling operation of the reader. Flip-flop circuits 62, 63, 64, 65, 66 and 67 correspond, respectively, with the serial number (SN), space following the serial number (SFSN), name section (NS), designation (DES), address (ADR) and telephone number (TN) sections of the listing. At the start of the listing each of flip-flops 62–67 is in reset condition. Each is set as the corresponding sections are read, and reset at the end of the section.

SN bistable circuit 62 is placed in the set condition by the occurrence of a line feed control signal in the fourth stage of the storage register ($LF_4$) and a numeral in the third section ($n_3$), together with an absence of a serial number indicated by $\overline{SN}$. These signals are coupled through AND gate 68 with flip-flop 62. During the serial number, flip-flop 62 is held in the actuated condition by a combination of signals SN and $\overline{SFSN}$.

After the serial number is completed, it is followed on the Teletype tape by a double space and the occurrence of the first of these spaces in the fourth register of the reader triggers bistable circuit 63, indicating the space following the serial number. This circuit is triggered by an AND gate responsive to signals SN and $SP_4$. Serial number flip-flop 62 is reset by the signal from $\overline{SFSN}$. The name section of the listing follows the space, and bistable circuit 64 is actuated by the appearance of an alphabetic character in register IV ($\alpha_4$), together with $\overline{SFSN}$, while circuit 63 is reset.

If a designation follows the name section in the listing, it is indicated in the Teletype signal by a space followed by a slash mark (/). The signal $SP_3$ and $/_2$ with NS, trigger bistable circuit 65.

The designation is separated from the address in the Teletype transmission by two spaces. These are sensed in the second and third storage registers and signals $SP_2$ and $SP_3$, together with DES actuate the address flip-flop 66. In listings without a designation, the address flip-flop 66 is actuated by $SP_2$, $SP_3$ and NS.

Flip-flop 64 is reset upon actuation of either flip-flop 65 or 66.

A double space occurs in the transmission between the address and the telephone number; and the telephone number flip-flop 67 is actuated by a combination of $SP_2$, $SP_3$ and ADR. Flip-flop 67 is reset by the carriage return signal ($CR_4$).

In the event an error occurs and is discovered by the operator, an Ignore signal is sent, followed by a line feed (LF). Flip-flops 63, 64, 65 and 66 are reset by LF₃. An ignore or typeout condition, developed in FIGURE 10, resets flip-flop 62.

The clock circuits are shown in the left hand portion of FIGURE 6, and include pulse generator 70 synchronized by a 60-cycle signal which has a negative pulse output of 100 micro-second duration. The clock signal is blocked in AND gate 71 by inverted Letter, Numeral signals from FIGURE 4. This prevents transfer of information through the reader storage register, and operation of other circuitry on occurrence of the control signals.

Three character width decoders 75, 76 and 77 receive the character signals from decoder IV (FIGURE 4) and provide character information signals to a font change device and width encoder 78 in which character width signals are generated in accordance with the characters of the listing and the style of type being used. The font change function of device 78 is necessary when preparing directories utilizing different type styles which have characters of different widths. The various communities served by one printing plant may each have their own preference with regard to type style. Decoders 75, 76 and 77 represent shift or upper case characters, unshift or lower case characters and bold face characters, respectively, and provide correct width information for each variety of character. Light face and standard type characters have the same width and need not be distinguished. The three decoders are controlled by AND gates 80, 81 and 82. The width decoder gates 80, 81 and 82 are blocked by a signal from width encoder flip-flop 83 following the telephone number as the signal TN is applied to the reset terminal of the flip-flop. The width encoder flip-flop is set at the start of the name section of the listing by $\overline{SFSN}$.

Bold face type is utilized for the name section of special listings, under the control of a bold flip-flop 84. In the presence of a bold face command signal, 1/4, flip-flop 84 is set, opening gate 82 and rendering decoder 77 operative. Shift and unshift gates 80, 81 are not used as bold listings are all upper case. Bold flip-flop 84 is reset at the end of the name section (NS). When flip-flop 84 is in Reset condition, $\overline{BOLD}$ opens gates 80 and 81.

For most listings, bold face flip-flop 84 is in reset condition and gates 80 and 81 are utilized. Shift and unshift information for the character width decoders is derived from the reader sequence and character signals which control Shift-Unshift flip-flop 86. When the flip-flop is set, gate 80 is open. When the flip-flop is reset, gate 81 is open.

Several conditions will set flip-flop 86. An alphabetic character following a space is capitalized requiring a shift condition. AND gate 87 has inputs $SP_4$, $α_3$, US, $\overline{DES}$ and clock. Accordingly, whenever a space in the fourth register is followed by an alphabetic character in the third register and the system is an unshift condition, and not in the designation section of the listing, flip-flop 86 is set opening shift gate 80, to activate shift decoder 75.

Numerals and hyphens are obtained in the shift condition of the Linotype machine, and either a numeral or a hyphen in the third section of the storage register ($n_3$ or $\overline{\phantom{-}}_3$) actuates flip-flop 86 into the shift condition. Designations which are set in capital letters also require shift signals. Four such designations are utilized in the control. These are DDS, CPA, DO and MD. AND gates 88 detect the presence of these alphabetic sequences with a slash (/) in the fourth register causing a shift condition for the balance of the designation.

An unshift signal resets flip-flop 86 opening gate 81 to utilize unshift decoder 76. In the usual situation, the first letter following a space is capitalized and the remaining letters are set lower case. Accordingly, with a shift condition and alphabetic characters in the third and fourth registers and in a section other than the telephone number or designation, gate 90 is actuated resetting shift flip-flop 86. Where a multiple directional designation is utilized in the address, one of the series of gates 92 is actuated in turn actuating gate 93 and upper case flip-flop UC, inhibiting operation of unshift gate 90. Gates 92 are actuated by the occurrence of directional characters, i.e., NE, NW, etc., and by other similar indications used in an address, as RR. All such designations will be referred to as directionals. AND gate 93 requires a space in the first and fourth register of the reader, and the address section of the listing, together with the directional characters in the second and third registers.

A numeral followed by an alphabetic character produces an unshift signal, as for example in 1ST. This is achieved by gate 94 having inputs $N_4$ and $α_3$.

Spaces in the listing may be provided either by thin spaces (TH/SP) or by a space band (SB). One or the other is inserted by a space signal in the fourth register of the reader ($SP_4$). The space bands in a Linotype machine have a variable width to wedge the character slugs tightly. It is desirable that at least two space bands be provided in each single line listing. Preferably the space bands are used in the address section of the listing, and thin spaces in the name section and address. The space band circuitry is discussed in connection with FIGURE 7. The circuitry for providing thin spaces is shown in FIGURE 6.

The basic thin space control is AND gate 96 which provides a thin space signal on the occurrence of $SP_4$ if thin space flip-flop 97 is set. SFSN sets flip-flop 97 at the start of the Name Section. It may also be set by $SP_4$ in the name section, or by $SP_2$ in the telephone number. The thin space flip-flop is reset shutting off gate 96 at the end of the name and telephone number sections and by the occurrence of an ampersand in either the second or fourth registers of the reader. Ampersands are transmitted over Teletype with spaces before and after them, and these spaces must be eliminated in programming the typeset machine.

A space band will be provided on signal $SP_4$ if space band gate 100 (FIGURE 6) is open. The control for gate 100 is shown in FIGURE 7. The signal for opening this gate is obtained from the space band flip-flop 101. Or gate 102 has a plurality of inputs which will set flip-flop 101 and provide a space band gate opening signal until flip-flop 101 is reset.

AND gate 103 senses the occurrence of certain letters in an address following a numeral, which letters might be confused with the numeral. For example, a numeral followed by the letter I, O or S could be misread. Normally, the space between a numeral and a letter in an address is closed up in printing the directory. However, with the letter I, O or S, a space band is inserted.

With streets having names, the space in the Teletype signal between the house number and the street name is eliminated. Some addresses are made up of a house number followed by a street numeral, as for example "123 13th Street." Here again, a space band is inserted. Gate 104 senses the combination of address, numerals in the second and fourth registers and a space in the third register, to open the space band gate.

Gate 105 provides a space band in an address having a hyphen followed by an alphabetic character as in 258–A. Gate 106 provides a space band following a single character directional, i.e., N, E, S or W, in the address. Gate 107 is actuated by spaces in the second and third registers other than during the serial number or the space following the serial number. This circuit inserts a space band before the address and after the address if a second space band was not already inserted.

A counter circuit 108 inhibits operation of gate 107 at the end of the address if two space bands have already been inserted. Since the space before the address always occurs, at least two space bands are counted in each listing.

Space band control flip-flop 101 may be reset by several conditions. A space in the fourth register during the telephone number actuates gate 109 to reset flip-flop 101 and prevent the insertion of a space band in the telephone number. In the address section, a space in the fourth register actuates gate 110 to reset flip-flop 101 after the second space band providing flip-flop 111 is reset, as it will be unless the address includes a directional. A directional input to AND gate 112 sets flip-flop 111. Flip-flop 101 is also reset at the end of the designation, by a slash in the second register and an alphabetic character in the third, which actuates gate 113.

Figure 9:
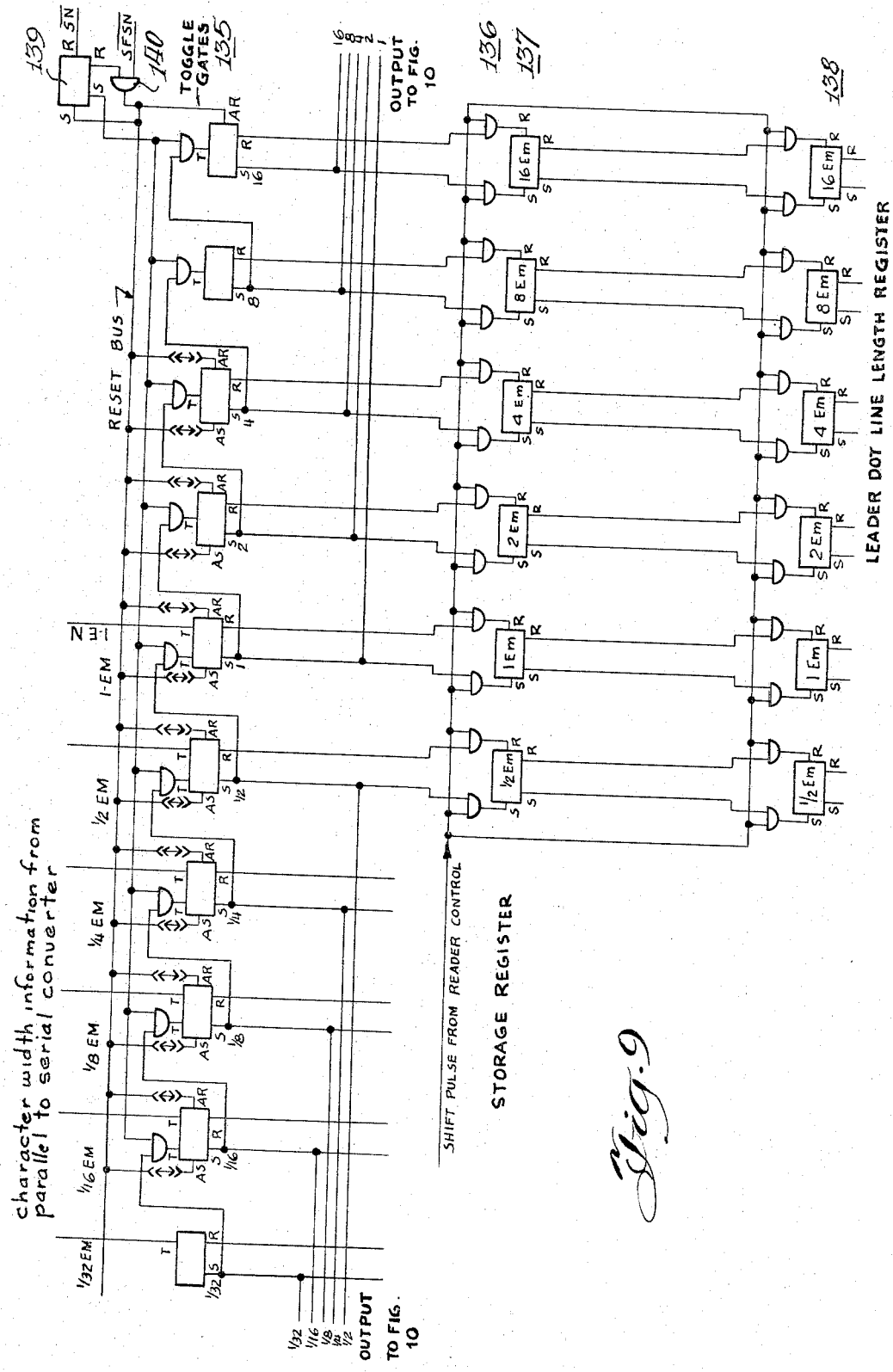
FIGURE 9 is a block diagram of the line length accumulator and storage register.

The character width information from the width encoder of FIGURE 6, for each character, is in the form of one or a plurality of signals which represent the character width in terms of ems. Character dimensions are in multiples of $\frac{1}{32}$ em; and where the character width requires a plurality of signals, the signals are generated in the width coder simultaneously. For example, if the width of the character is $\frac{3}{8}$ em, there will be simultaneous signals on the $\frac{1}{4}$ and $\frac{1}{8}$ em lines (FIGURE 8). It is necessary that this information be converted to serial signals so that it can be added in the line length accumulator. In the converter of FIGURE 8, the information from the width encoder is stored in an entry register 120, comprising six flip-flop circuits corresponding with the six-channel output from the width encoder. Each entry register flip-flop is connected to be set by the corresponding signal from the width encoder. Information is coupled out of the width encoder to the line length accumulator (FIGURE 9) through a series of AND gates 121 which are serially opened. Output gates 121 are actuated by signals from a three stage pulse train generator 122 which produces pulse at a 600 cycle rate. Upon the receipt of any information from the width encoder, a signal is coupled through OR gate 123 to AND gate 124, setting pulse train generator control flip-flop 125. A 600 cycle square wave signal is obtained from oscillator 126 and is coupled through AND gate 127, opened on set condition of flip-flop 125, to the first stage 122a of the pulse train generator. Succeeding stages 122b and 122c of the pulse train generator are actuated sequentially to provide control signals for serial output gates 121. The smallest measure, $\frac{1}{32}$ em, is released first, upon actuation of pulse train generator flip-flop 122a from the $\bar{1}$ to the 1 condition. On the second cycle, flip-flop 122a reverts to $\bar{1}$ condition and flip-flop 122b switches to the numeral 2 condition. This opens the $\frac{1}{16}$ em gate. The operation is continued until all of the information stored in entry register 120 has been transmitted to the line length accumulator. Upon completion of the cycle of operation of pulse train generator 122, each of the three flip-flops is in set condition providing output 124. This combination acts through reset gates 128 to reset the entry register 120. At the same time control flip-flop 125 is reset closing gate 127 and stopping the operation of the generator. In this condition, the generator output $\bar{1}$, $\bar{2}$, $\bar{4}$ reopens register entry gates 129 readying the converter for the next character width information from the width encoder.

The line length accumulator (FIGURE 9) has an adding circuit including ten flip-flops or toggle gates 135. The flip-flops are serially interconnected so that two actuations of one will cause an actuation of the next. For example, assume that all of the toggle gates are in the reset condition and a $\frac{1}{32}$ em signal is received. The $\frac{1}{32}$ em flip-flop switches to the set condition, but has no other effect on the circuit. On the occurrence of the next $\frac{1}{32}$ em signal, the $\frac{1}{32}$ em flip-flop is reset, causing the $\frac{1}{16}$ em flip-flop to set. This relationship is carried out through the entire counter circuit. As the character width information from the parallel to serial converter is received in the first six stages of the counter, the line length information is totalled. At the end of a listing, a shift pulse is received from the reader control (to be described below), which opens gates to transfer the information in counter flip-flops $\frac{1}{2}$ em–16 em into storage register 137. At the same time, information which was already in storage register 137 is transferred to leader dot line length register 138. The information in register 138 is utilized in the second reader to control the insertion of leader dots to complete each line. Outputs are derived directly from the set terminals of each of the counter flip-flops for use in the ability control network of FIGURE 10.

At the start of each listing, the occurrence of $\overline{SN}$ signal at the end of the serial number resets flip-flop 139, blocking the input of further information to the toggle gate counter circuit 135. At the end of the space following the serial number, signal $\overline{SFSN}$ opens gate 140 resetting the toggle gate flip-flops 135, and establishing a set condition of control flip-flop 139 reopening the input gates to the flip-flop counter.

Jumper connections are indicated in the drawing between the reset bus and the automatic set and automatic reset (AS, AR) terminals of each of the counter flip-flops. Only one reset connection is made for each flip-flop, so that it may be conditioned at the start of a listing to either the set or reset condition. Counter 135 has sufficient capacity to handle the maximum line length of any directory which may be encountered, although some directories may use the shorter line length. In setting shorter listings, set jumper connections are made to appropriate toggle gate flip-flop sections to start the count at such point that a maximum line length of 24 em is achieved. For example, in a particular directory a line length of 15 em is utilized, the 1 em and 8 em flip-flops are placed in the set condition at the start of a listing, rather than the reset condition.

There are four possibilities in handling each of the listing signals received. A normal listing is set automatically. Some listings are to be ignored, as those including errors. Listings which cannot be handled automatically must be typed out, as explained in connection with FIGURES 1 and 2. Listings with an address overrun (a length in excess of that which can be handled on a single line) are automatically set as a two line listing with the name on the first line, justified with the left margin, and the address and telephone number on the second line, justified with the right margin.

Turning now to FIGURE 10, the ability control sensing circuits are as shown. The ignore, typeout and two-line listing control signals are established in storage register flip-flops 145. Control information is transferred, upon the command of shift pulses from the reader control (described below), from flip-flops 145 to storage register 146 and then to control register 147 which provides outputs to the second reader circuits.

The Ignore signal is established by setting IGN flip-flop in register 145. This may be done by one or two conditions. The first is controlled by AND gate 148, having inputs $.4$, $K_2$, $I_1$. These inputs will be established in the event an error occurs in the transmission and the transmitting operator types the error signal, a series of periods followed by the word "KILL."

The second ignore situation is established by AND circuit 149. Listing flip-flop LSTG is set at the end of a serial number, providing one of the inputs for gate 149. The second is provided by the occurrence of either an X or a slash in the second section of the reader ($X_2$ or $/_2$) with a carriage return signal in the third section ($CR_3$). This recognizes another error signal, which is carriage return followed by a series of X's or slashes striking out the previously typed portion of the message. LSTG flip-flop is reset by the carriage return signal in the fourth section of the reader.

The typeout signal (TYPE) is established by an input to either of OR gates 152 and 153. OR gate 152 has four inputs. The first is derived from AND gate 154, which is opened upon the occurrence of three consecutive spaces SP$_2$, SP$_3$, SP$_4$, during a listing (i.e., LSTG flip-flop set). This is an abnormal transmission and cannot be typeset automatically.

AND gate 155 is opened in the absence of an ignore condition ($\overline{\text{IGN}}$) during a listing by the occurrence of carriage return signal (CR$_3$) in the third section of the reader, except during the telephone number section of the listing ($\overline{\text{TN}}$). A carriage return signal prior to the telephone number indicates an unusual situation requiring manual setting.

The third input of OR gate 152 is provided by AND gate 156 which has inputs of SP$_3$ and /$_2$ in the address section of the listing. An address with a slash mark is utilized in the Teletype transmission to indicate a foreign listing or other special information, which should be set manually. A fourth input of gate 152 is derived from AND gate 157, which detects a name overrun. It is conditioned for operation only during the name and designation section of the listing by flip-flop 158 which is set at the end of the serial number ($\overline{\text{NS}}$) and reset at the end of the address ($\overline{\text{ADR}}$). The other inputs are derived from line length accumulator of FIGURE 9. In the system shown, a total of 21½ em plus a fractional count (i.e., ¼, ⅛, ¹⁄₁₆ or ¹⁄₃₂ em) is required to open gate 157.

A further input to the typeout control is derived from OR gate 153, on the occurrence of a period, ditto or dollar sign, symbols which cannot be handled automatically.

The address overrun circuit determines the length of the listing. If this is excessive, a signal (J$_2$) to the second reader provides for a two-line listing. Two AND gates 163 and 164 provide set inputs to the address overrun flip-flop of register 145. Both are responsive to the width encoder flip-flop 83 (see also FIGURE 6) which is set at the end of the space following the serial number and reset at the end of the telephone number. Gate 163 has inputs corresponding with an em count of 23½+. AND gate 164 senses a maximum length for the listing of 24+ em. A further input for AND gate 163 is derived from AND gate 165, which opens with a combination of numerals in the first and second fourth stages of the reader with intervening spaces in the second and third sections. This combination of numerals sets a flip-flop 166 completing the inputs for gate 163. The gate 165 and flip-flop 166 detect the combination of an address ending in a numeral and a telephone number starting with a numeral. In this case a leader dot must be inserted between the address and telephone number, reducing the available line length.

As pointed out above, where the directory for which type is being set has a line length shorter than the maximum handled by the control, the line length accumulator is reset at an appropriate point above zero.

The second reader circuitry (FIGURES 11–16) reads the punched tape a second time and, in response to the control signals from the first reader, directs the listing information either to a punch control for preparing the Linotype control tape, or to a typewriter, if the listing cannot be set automatically. Single line listings which are set automatically utilize the line length control information established in the first reader to insert a proper number of leader dots to fill the line, between the address and the telephone number.

Turning now to FIGURE 11A, the second tape reader and decoder circuitry are shown. This circuit is essentially the same as that of the first reader and will not be described in detail. The five channel tape information is sensed by the five switches in section V. The information is coupled sequentially to storage registers of sections VI and VII and VIII, through gates (not shown) controlled by clock pulses. A figure, letter and space detection circuit 170 provides character information to the clock circuit (FIGURE 12) and to the reader escapement coil 171. A sixth channel of the second reader storage register provides a figure and letter information, as in the first reader. Outputs to a punch encoder are derived from the coder VIII and comprise 42 possible signals representing the 26 letters, 10 numerals and six control signals and character indicators. A typical circuit is illustrated for an alphabetic character detector. Signals corresponding with the four possible control signals (tape feed, carriage return, line feed and space) are coupled with AND gate 172 through an inverter 173 which has an output in the absence of all commands. AND gate 174 is connected with the output of the converter and with letter (LTR) output of the sixth channel of storage register VIII. In the presence of a letter indication from the sixth channel, and the absence of all four control signals, an output appears from gate 174 indicating the presence of an alphabetic character.

The second reader sequence control (FIGURE 11B) has a series of flip-flop circuits actuated sequentially to provide control signals representative of the section of the listing passing through the reader. Flip-flop 177 is set by a combination of a line feed signal in register 8 (LF$_8$) and a numeral in register 7 (N$_7$), indicating a serial number of a listing. Flip-flop 178 is actuated, following the setting of flip-flop 177, upon the occurrence of a space in register VIII of the reader. Name section flip-flop 179 is set after the space following the serial number upon the occurrence of an alphabetic character in section VIII of the register. If the listing includes designation, flip-flop 180 is set by SP$_7$ and /$_6$ following a set of the name section flip-flop. Address flip-flop 181 is set by a double space (SP$_7$ and SP$_6$) together with actuation of either NS flip-flop 179 or DES flip-flop 180. The telephone number flip-flop 182 is set by SP$_7$, SP$_6$ following set of address flip-flop 181.

As in the first reader sequence control, each flip-flop is reset on actuation of the next succeeding flip-flop. In addition, serial number flip-flop 177 is reset by either of two inputs to OR gate 183. The first input is derived from AND gate 184, and includes a numeral (serial number) in the eighth register together with a type instruction. A second input is derived from AND gate 185, and includes a numeral (serial number) in register VIII, set of the serial number flip-flop and an ignore signal. Telephone number flip-flop 182 is reset by a line feed signal in register VIII.

The second reader clock circuit (FIGURE 12a) includes two signal sources, 190 and 191, operating at 60 and 10 cycles per second, respectively. The normal operation of the second reader is at the 60 second cycle rate. However, when a listing must be typed out, the 10 cycle rate is used because of the lower speed of operation of the typewriter. Typeout flip-flop 192 controls the selection of clock signal source. The flip-flop is set with a TYPE signal and reset with a $\overline{\text{TYPE}}$ signal.

As the signal sources 190 and 191 are not synchronized, the transfer between them is gated by a source signal. For example, assuming that the system is operating with a 60 cycle clock when a typeout signal is received, flip-flop 192 is set providing an input to AND gate 193. On the occurrence of the next cycle of 10 cycle source, the second input of gate 193 is provided setting control flip-flop 194 and opening gate 195. Flip-flop 194 is reset by a shift pulse at the end of the listing. A similar circuit is provided for the 60 cycle source. The selected source output drives a clock pulse generator 196 which in turn is gated by a figure-letter signal from the second reader (FIGURE 11) in AND gate 197.

The main control relay (MCR) 198 controls the application of clock signals to the various circuits in the second reader. During the internal generation of signal for the Linotype control, it is necessary that the operation of the second reader and certain of the circuitry be suspended. Accordingly, the main control relay in a set condition applies clock signals to one group of circuits and in a reset condition applies them to another group of circuits, as will appear. Various control signals set and reset the main control relay; and these functions will be pointed out during the following description.

It is necessary to provide an upper rail signal before the leader dots are punched in the Linotype control tape. Section B of FIGURE 12 shows the upper rail shift control. A sequence counter 200 is actuated at the end of the address section of the listing and provides control signals to the punch encoder gate circuits in FIGURE 14. The sequence counter operates in much the same manner as the pulse generator of the parallel to serial converter (FIGURE 8), but at clock frequency. The sequence of operation is indicated by the numerals in each of AND gates 201–207. On a count of 1 (1, $\bar{2}$, $\bar{4}$), gate 201 provides a shift signal (SH) at terminal M. At the end of the address, normally a space band is inserted by actuation of gate 202, providing a signal to terminal N (FIGURE 14). If the line length storage register 138 shows a total of 24½ em, gate 203 is actuated rather than 201, inserting a hyphen, instead of a space band at the end of the address. In the event two space bands have already been inserted flip-flop 210 is set, preventing actuation of either of gates 201 and 202. Upper rail gate 204 is actuated next, providing a control signal at terminal K. On the next actuation of counter 200, gate 205 is actuated, if it is a one line listing ($\bar{J}_2$), providing an output to the leader dot circuit terminal J. On the final operation of counter 200, gates 206 and 207 are actuated. In a one line listing ($\bar{J}_2$), the main control relay is set. In a two line listing ($J_2$), a signal is provided to EN leader circuit terminal H, to set one dot between the address and telephone number and to set the main control relay.

In the event two space bands have already been inserted in the listing, both the space band and hyphen gates 201 and 202 are prevented from actuation by setting flip-flop 210. This occurs with the designation signal ($\overline{DES}$) or with an input of SPBD set from flip-flop 101. Flip-flop 210 is reset by the telephone number signal from the reader sequence control. The space band hyphen, MCR "AS," and leader dot gates 201, 202, 205 and 206 are each prevented from actuation with a two-line listing, as the $\bar{J}_2$ input is not present.

Figure 13:
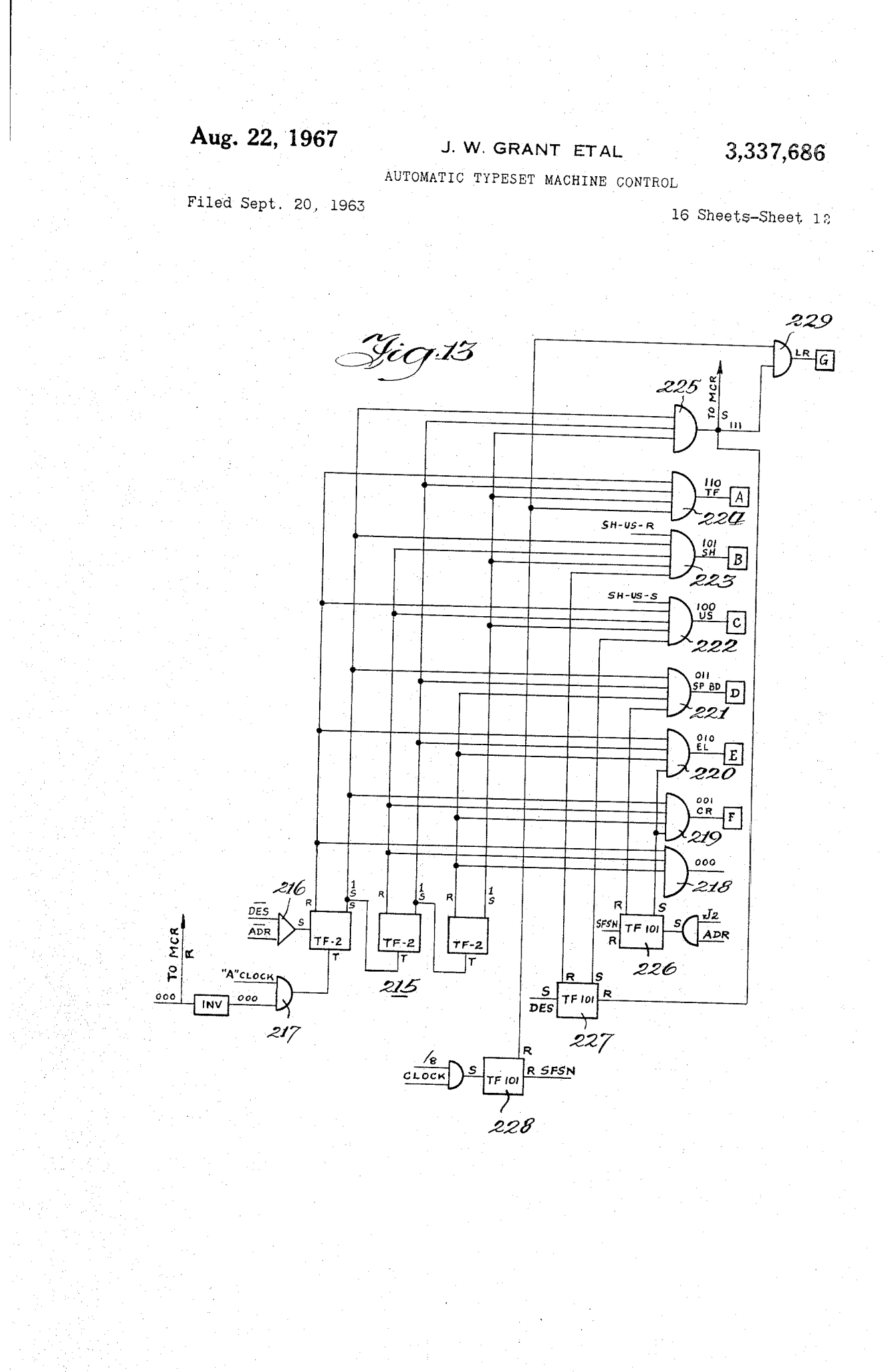

The circuit of FIGURE 13 provides a series of control signals to the punch encoder input circuit gates (FIGURE 15), to generate a lower rail signal for the Linotype, setting the designation and address sections of the listing in the light face type. The circuit includes a counter or pulse generator 215 which operates at the clock frequency and is started at the beginning of the designation or address sections of the listing. $\overline{DES}$ and $\overline{ADR}$ signals are coupled throught OR gate 216 with the set terminal of the first stage of pulse generator 215. The clock signal is coupled through OR gate 217 with $\overline{000}$ so that the pulse generator continues operating for one complete cycle. A series of AND gates 218–225 provide outputs for each count of the pulse generator.

Counts 001 and 010, AND gates 219–220, are further controlled for a two line listing. With a $J_2$ signal during the address section flip-flop 226 is set and AND gates 219–220 are open providing an output signal for carriage return (CR) to terminal F and elevate (EL) to terminal E. In a single line listing a reset signal from flip-flop 226 opens gate 221 on count 011 providing a space band signal (SP BD) to terminal D.

Gates 222 and 223 are opened on counts 100 and 101 respectively, providing unshift (US) and shift (SH) signals. These gates are further controlled by flip-flop 227 for an unshift signal for a listing with a designation, most of which are set in lower case type, and a shift for the address section to capitalize the first alphabetic character.

Flip-flop 227 is set with $\overline{DES}$ providing a further input signal to unshift gate 222. In addition, shift-unshift flip-flop 250 (FIGURE 14) must be set. Shift gate 223 operates at count 101 with a reset condition of flip-flop 227 and of the shift/unshift flip-flop 250.

Tape feed gate 224 is opened on count 110 with a reset condition of flip-flop 228. This flip-flop is reset by SFSN, and is set for a listing with a designation, by /8.

The master control relay (FIGURE 12) is reset during operation of counter 215 which set it with 000. This prevents operation of the reader during generation of the lower rail signal. On the count 111, gate 225 is actuated providing set signal to MCR flip-flop and, with a reset condition of flip-flop 228, opening gate 229 providing the lower rail signal to terminal G.

In summary, for a listing with a designation, the following signals are generated: space band, unshift, tape feed and lower rail. For an address following a designation, space band and shift signals are generated. For an address alone, the sequence is space band, shift, tape feed, lower rail.

The punch encoder command signals are generated by ten AND gates 235–244 (FIGURE 14), each of which has two inputs, one from the clock and the other from a corresponding OR gate 235a–244a. Each of the OR gates has one or more inputs which establish the desired control signals upon the occurrence of the clock signal.

Space bands are generated by signals occurring either at terminal D or N. Terminal D (FIGURE 13) provides a space band before the address and before the designation, if one is used. A signal at terminal N (FIGURE 12) provides a space band at the end of the address, if two have not already been provided in the listing.

Shift and unshift signals are provided by gates 237 and 238, with appropriate inputs to OR gates 237a and 238a. A shift signal is required whenever an alphabetic character follows a space in order to set a capital letter. Such a shift is followed by an unshift signal. Shift signals are also required for setting numerals and certain other special characters, in the middle of compound names and in special designations. A shift-unshift flip-flop 250 provides a signal indicative of the last previous shift or unshift signal to condition the shift and unshift AND gates. Shift AND gates 251, 252 and 253 have an input from the reset terminal of flip-flop 250. Unshift AND gates 254 and 255 have inputs from the set terminal of flip-flop 250. The shift signals are generated by a shift flip-flop 256 while unshift signals are developed by unshift flip-flop 257.

A set control terminal of flip-flop 256 has an input provided by shift OR gate 258. A first input for OR gate 258 is derived from AND gate 251 upon the occurrence of an alphabetic character following a space, in other than the designation section of the listing. Gate 252 is actuated upon the occurrence of either a numeral or a hyphen (both of which require an upper case shift) in the seventh reader storage section.

AND gate 253 provides a shift for capitalizing the B of O'Brien and similar multiple-capital names. The gates require a comma in the eighth section of the reader and that O'Brien flip-flop 260 be set. This flip-flop is set on the occurrence of a space in the eighth section of the reader with a comma in the sixth section. It is reset by two successive alphabetic characters.

The fourth input for OR gate 258 is derived from a series of AND gates 261, which provide multiple-capital letters in those designations which require it. Shift signal flip-flop 256 is reset by the clock signal following setting.

Unshift flip-flop is actuated after a shift signal has been given, upon actuation of AND gates 254, 255 or 259. Gate 254 is actuated on the occurrence of either a comma or an ampersand in the seventh section of the reader. These characters are set from the lower case section of the Linotype machine. AND gate 255 is actuated by alphabetic characters in the seventh and eighth sections of the reader, except during the telephone number and designation sections. An Unshift condition is prevented by UC flip-flop 255a if a directional designation or the like appears in the address. The indicated combination of letters in the sixth and seventh registers with spaces in the fifth and eighth registers set flip-flop 255a, removing an input to gate 255. Flip-flop 255a is reset by $Sp_8$. AND gate 259 responds to an alphabetic character following a numeral to provide an unshift condition.

Unshift flip-flop 257 is reset by the next clock pulse following a set condition.

The master control relay flip-flop is set upon setting of either the shift or unshift flip-flops 256 and 257, and is reset upon the reset of either of them. This interrupts the operation of the readers to permit insertion of the control codes on the Linotype tape without missing a character of the incoming Teletype tape.

Shift signals are also obtained from terminal B, FIGURE 13 (start of address) and from terminal M, FIGURE 12b (start of telephone number).

An additional unshift input signal is derived from terminal C, FIGURE 13 (start of designation).

The upper rail control signal for gate 239 is derived at terminal K, FIGURE 12b, described above. The lower rail signal for gate 240 is obtained from terminal G, FIGURE 13, to provide light face type for the designation and address.

In a two-line listing, it is necessary that the second line be justified with the right margin, a "quad right" condition. The QR control signal from AND gate 241 is provided upon a set condition of QR flip-flop 262. The flip-flop is set by $J_2$ (address overrun) with a carriage return signal in the seventh section of the reader. The carriage return signal occurs at the end of the listing after the telephone number has been set.

A return signal (RET) for gate 242 is provided at the start of the address section of a two-line listing, from terminal F, FIGURE 13. An elevate signal, gate 243, is provided under the same conditions from terminal F, FIGURE 13.

Tape feed signals are provided by gate 244 upon setting tape feed flip-flop 263, and upon the establishment of a tape feed signal at terminal A (FIGURE 13).

The leader dot input control circuit is shown in FIGURE 15. The third line length storage register 138 (FIGURE 9) is reproduced in FIGURE 15. Briefly, after the address, leader dots are inserted, if necessary, and appropriate character width indications are added to register 138 until it is filled. Thus, sufficient leader dots are set to fill the line. The leader dot initiation signal is provided at terminal J (FIGURE 12b) and is coupled through AND gate 265 to set leader flip-flop 266. This occurs only if there are less than 24 em already in the storage register. Assuming that the accumulated line length is less, flip-flop 266 is set providing an input to en-em flip-flop trigger gate 267. On the occurrence of each succeeding clock pulse, en-em flip-flop 268 is triggered providing alternate en and em pulses on the set and reset terminals, to en and em gates 269 and 270, respectively. En-em flip-flop 268 requires a set signal $SP_8$ (at the end of the address) for its initial actuation. As the en and em gates are actuated, signals are coupled to the ½ and 1 em sections of register 138 so that the width of the leader dots is added to the line length total. As the starting line length is not known, and en and em leader dots are inserted alternately, it is necessary to provide two stopping circuits. A line length total of either 23½ or 24 em will be achieved, resetting flip-flop 266. If a count of 23½ is reached, Tape Feed flip-flop 277 and En flip-flop 273 are actuated, filling the line. When the line length total reaches 24, leader flip-flop 266 is reset ending the insertion of leader dots.

It will be recalled that the first register of the line length accumulator may be set to start counting at a number higher than 0. This starting point is selected so that the total line length for any given directory style is 24.

The punch encoder 280 with its various inputs and outputs is shown in FIGURE 16. Forty-two character signals are received from decoder VIII. These include the alphabetic characters A through Z, the numerals 1 through 0, the hypen, 1/2, ampersand, the comma, carriage return and line feed signals. The encoder also receives command signals from the circuits of FIGURES 14 and 15, controlling elevate, carriage return, quad right, lower rail, upper rail, unshift, shift, en and em leader dots and space band designations.

Further, space band and thin space control signals are generated in circuit 285. With one exception, this circuitry is identical with that of the first reader (FIGURES 6 and 7) and will not be described again. The exception is concerned with the handling of compound names. A name as MacDonald is transmitted over the Teletype with a space between the C and the D. The space provides the signal for capitalizing the D (see shift circuit FIGURE 14) but must be eliminated in setting the listing. A series of gate circuits 286 detect the letter combinations at the start of the compound names. On the occurrence of any such combination, thin space flip-flop 287 is reset, so that the space signal is ignored. This operation is performed only for the surname by including an SFSN input to AND gate 288 between the alphabetic character detectors and the reset terminal of the flip-flop.

The output of punch encoder 280 is in the form of a six channel signal, and is coupled with the punch 300. Serial numbers, and other signals which are not part of a listing, are kept from the punch by AND gates 301 connected through inverter 302 with the reset output terminal of punch on/off flip-flop 303. Thus, gates 301 are permitted to function when flip-flop 303 is in the set condition which occurs at the end of the space following the serial number. Flip-flop 303 is reset at the end of the telephone number closing gates 301.

Tape feed signals to the punch are derived from each of the six code lines and from a variety of other inputs in the system, described above. Typewriter 310 receives signals from reader storage register VIII for listings which cannot be set automatically. This operation is under the control of the 10 cycle clock, and requires an absence of figure and letter signals (FIGURE 11) or of the set signal from the master control relay (FIGURE 12).

The same typewriter may be utilized to type listings which are being set manually, and it has a six channel output connected through OR gates with the output of punch encoder 280.

An additional Tape Feed control is provided by the circuit of FIGURE 17. If two identical characters follow each other, the Linotype machine operation must be delayed to permit the mechanism to complete its cycle. An extra Tape Feed, without a character being punched, provides this delay.

The inputs for the circuit of FIGURE 17 are derived from the five channels of the second reader decoders VII and VIII, and the numerals represent each of the five channels. When all five codes agree in the two registers, and either an alphabetic or numeric character is present, gate 315 is actuated, providing a tape feed signal.

Figure 18:
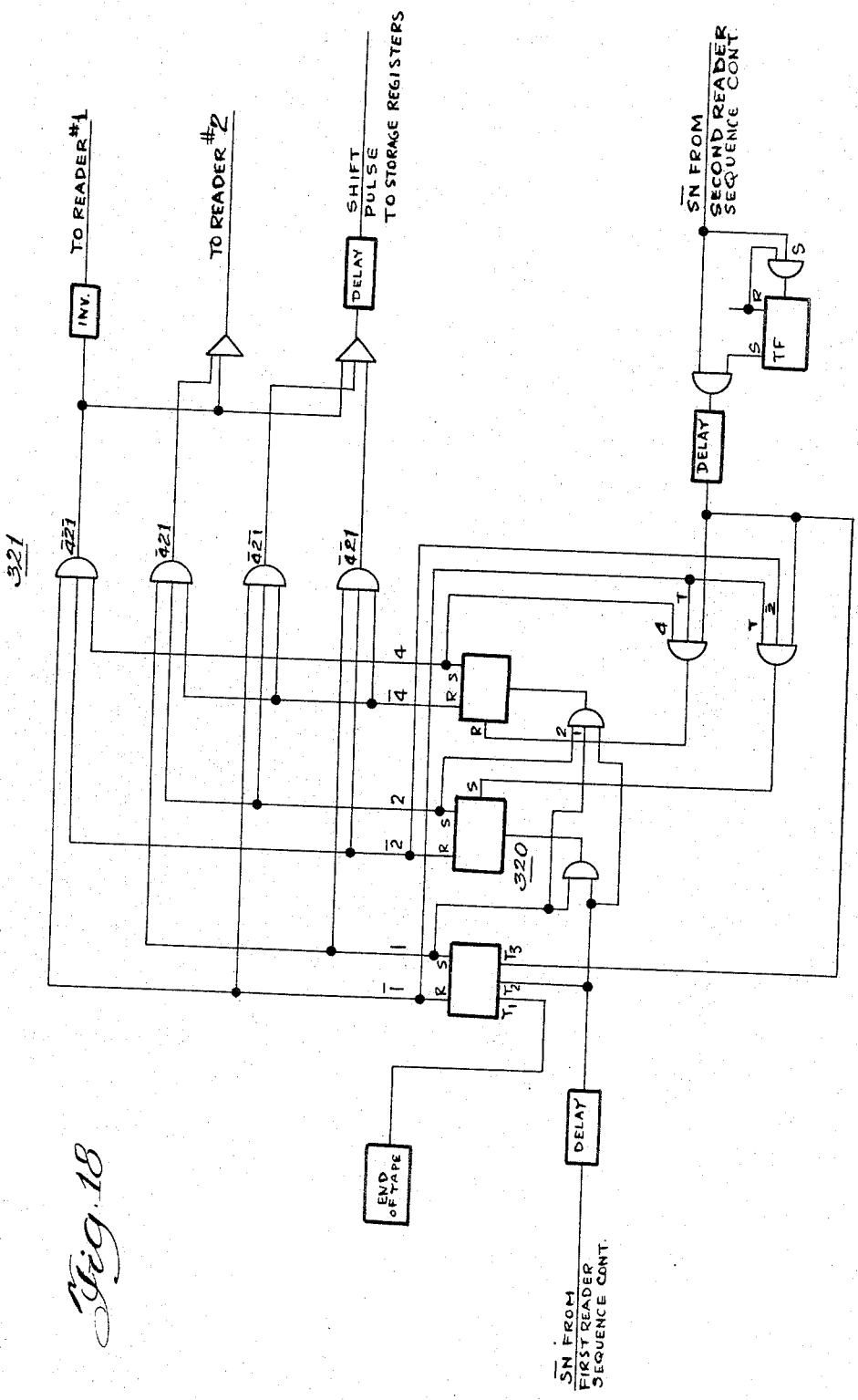
FIGURE 18 is a block diagram of the reader control circuit.

The two readers must be operated in synchronism so that the first reader stops operating at the end of a listing if the control information therefrom cannot be transferred from register 33 (FIGURE 2) to register 34. As the second reader operates at a slower speed than the first reader, it is the usual situation that the first reader scans a listing and then stops and waits for the second reader to finish the listing on which it is operating, in order that the control information may be passed along. This correlated operation of the two readers is provided by the circuit of FIGURE 18. A three-stage pulse generator 320 provides outputs to gates 321 which in turn provide the control signals to the two readers and to the storage registers between them. The occurrence of $\overline{SN}$ signals from the first reader sequence control causes the pulse generator to count in one direction, while the occurrence of $\overline{SN}$ signals from the second reader sequence control causes a count in the opposite direction. Delay networks in each input line hold the input AND gates after conditions reverse in the two reader sequence control serial number flip-flops.

At the start of a listing conversion operation, all three flip-flops are in the reset condition. The first serial number from the first reader sequence control trips the first counter flip-flop from a $\overline{1}$ to 1 condition. The second serial number reverses the condition of the first flip-flop ($\overline{1}$) and trips the second flip-flop to the $\overline{2}$ condition. The third serial number sets the first flip-flop while the fourth serial number resets the first, second and sets the third, a count of $4\,\overline{2}\,\overline{1}$. This stops the first reader before the fourth listing is read. In normal operation, the second reader starts with a count of $\overline{4}\,2\,1$ and the first reader continues until the count goes to $4\,\overline{2}\,\overline{1}$ whereupon it shuts off. When the second reader finishes the listing, the count is reduced to 3 and the first reader is restarted to scan the next listing. Shift pulses to the storage registers are provided with a count shift from $\overline{4}\,\overline{2}\,1$ to $\overline{4}\,2\,\overline{1}$ and from either $4\,\overline{2}\,\overline{1}$ or $\overline{4}\,2\,\overline{1}$ to $\overline{4}\,2\,1$.

At the end of the tape, a pushbutton control provides an input to the first flip-flop of the counter, to permit a readout of the last two listings.

We claim:

1. An automatic typeset machine control for use in printing directory listings each having a plurality of sections, the listings having characters of different types, comprising: a source of input signals representative of characters in said listings, said signals representing characters of a single type; means for translating the character representative input signals into corresponding character representative typeset machine control signals; means for sensing characteristics of a plurality of said input signals; and means responsive to said sensed characteristics for controlling the type of said character representativve control signals.

2. An automatic typeset machine control for use in printing directory listings each having a plurality of sections, the listing having characters of different types, comprising: a source of input signals representative of characters in said listing, said signals representing characters of a single type and being divided into a plurality of groups corresponding with the sections of said listing, each group having a plurality of characters; means for translating the character representative input signals into corresponding character representative typeset machine control signals; means for sensing a plurality of characters of the groups of said input signals; and means responsive to said sensed groups for controlling the type of said character representative control signals.

3. An automatic typeset machine control for use in printing directory listings each having a plurality of sections, the listing having characters of different types, comprising: a source of input signals representative of characters in said listing, said signals representing characters of a single type and being divided into a plurality of groups corresponding with the sections of said listing; means for translating the character representative typeset machine control signals into corresponding character representative typeset machine control signals; means for sensing a pluraltiy of sequential character representative input signals; and means responsive to said sensed sequential input signals for controlling the type of said character representative control signals.

4. An automatic typeset machine control for use in printing directory listings each having a plurality of sections, with the listings having characters of different types, comprising: a source of input signals representative of characters in said listing, said signals representing characters of a single type and being divided into a plurality of groups corresponding with the sections of said listing; means for translating the character representative input signals into corresponding character representative typeset machine control signals; means for sensing the groups of said input signals; means for sensing a plurality of sequentail character representative input signals; and means responsive jointly to said sensed group and sequential input signals for controlling the type of said character representative control signals.

5. An automatic typeset machine control for use in printing directory listings, each having a plurality of sections, the listings having characters of different types, comprising: a source of input signals representative of the characters in said listing, said signals representing upper case characters and being divided into a plurality of groups corresponding with the sections of said listing; means for translating the character representative input signals into corresponding character representative typeset machine control signals of upper and lower case; means for sensing the grouping of said input signals; means for sensing a plurality of sequential character representative input signals; and means responsive to said group and sequential character sensing means for controlling the case of said character representative typeset machine control signals.

6. An automatic Linotype machine control or use in printing telephone directory listings, each having a plurality of sections, the listings having characters of different types, comprising: a source of five channel upper case Teletype control signals representative of the characters of said listing, said signals being divided into a plurality of groups corresponding with the sections of said listing; means for translating the character representative input signals into corresponding six-channel Linotype control character representative signals of upper and lower case; means for sensing the grouping of said input signals; means for sensing a plurality of sequential character representative input signals; and means responsive to said group and sequential character representative sensing means for controlling the case of said Linotype control signals.

7. An automatic typeset machine control for use in printing telephone directory listings, each having a plurality of sections, the listings having characters of different types, comprising: a source of input signals representative of the characters in said listing, said signals representing characters of a single type and being divided into name, designation, address and phone number groups corresponding with the respective sections of said listing; means for translating the character representative input signals into corresponding character representative typeset machine control signals of upper and lower case; means for sensing the grouping of said input signals; means for sensing a plurality of sequential characters of said input signals; means responsive to said group sensing means for grouping the control signals; and means responsive to the group sensing means and to the sensed sequential characters for controlling the case of the character representative control signals.

8. The typeset machine control of claim 7 including means for generating a control signal representing said name section of said input signals and responsive to a predetermined sequence of alphabetic character representing input signals to control the case of machine control output signals for selected compound names.

9. The machine control of claim 7 including control signal generating means responsive to said designation section grouping of said input signals and to a predetermined sequence of alphabetic characters in said designation group, and means responsive to a control signal from said generating means, and including a gate circuit for controlling the case of the character representing output signals in the designation group.

10. The machine control of claim 7 wherein address sections of the listings are printed in upper and lower case characters, the control including means for developing a control signal representative of the address section of the listing and means developing a further control signal representing a sequence of alphabetic characters in said address section, corresponding with an alphabetic address designation, and gate circuit means responsive to said control signals for establishing upper case output signals representing said address characters.

11. An automatic typeset machine control for use in printing directory listings, each having a plurality of sections, the listings having characters of different types, comprising: a source of input signals representative of characters in said listing, said signals representing characters of a single type and being divided into a plurality of groups corresponding with the sections of said listing; means for translating the character representative input signals into corresponding character representative typeset machine control signals; means for sensing the groups of said input signals; means for sensing a plurality of sequential character representative input signals; and means responsive to said sensed group and sequence of input signals for controlling the generation of auxiliary spacing representative control signals.

12. An automatic typeset machine control for use in printing directory listings, comprising: a source of input signals representative of characters in said listing, means for translating said input signals into corresponding typeset machine control signals; means for translating said input signals into automatic typewriter control signals; a first reader responsive to said input signals for analyzing characteristics of said listing and determining the disposition thereof; and a second reader responsive to said input signals and to said first reader for coupling character representative signals to one of said translating means.

13. An automatic typeset machine control for use in printing directory listings, each listing having a plurality of sections, comprising: a source of input signals representative of characters in said listing, said signals being divided into a plurality of groups corresponding with the sections of said listing; means for translating said input signals into corresponding typeset machine control signals; means for translating said input signals into automatic typewriter control signals; a first reader responsive to said input signals for analyzing characteristics of said listing and determining the disposition thereof; a second reader responsive to said input signals and to said first reader for coupling character representative signals to one of said translating means; a first reader sequence control circuit having an output signal corresponding with each group of said control signals; means responsive to said first reader for totaling the width of characters in each listing; means responsive to said reader control circuit group signal and to a character width total less than a predetermined minimum for directing the input signals to said typeset machine translating means; and means responsive to said reader control circuit group signal and to a character width total exceeding a predetermined minimum for directing said input signals to said automatic typewriter translating means.

14. The machine control of claim 13 wherein said character width totalling means includes a resettable counter having a capacity in excess of that required for setting said listings, and including means for establishing a reset condition of said counter greater than zero, whereby a maximum count in the counter corresponds with the desired line length of the listing.

15. An automatic typeset machine control for use in printing directory listings, each listing having a plurality of sections, comprising: a source of input signals representative of characters in said listing, said signals representing characters of a single type and being divided into a plurality of groups corresponding with the sections of said listing; a multiple section character signal storage register actuated by said input signals; a sequential control circuit having sections corresponding with the groups of said input signals and comprising a series of bistable circuits, each having an input and an output; gate circuits connected between said storage registers and said bistable circuit inputs for actuating said bistable circuits sequentially in accordance with predetermined combinations of characters in said storage registers.

16. An automatic typeset machine control for use in printing directory listings, each listing having a plurality of sections, comprising: a source of input signals representative of characters in said listing, said signals representing characters of a single type and being divided into a plurality of groups corresponding with the sections of said listing; a multiple section character signal storage register actuated by said input signals; a sequential control circuit having sections corresponding with the groups of said input signals and comprising a series of bistable circuits, each having an input and an ouput; gate circuits connected between said storage registers and said bistable circuit inputs for actuating said bistable circuits in accordance with predetermined combinations of characters in said storage registers, said bistable circuits being connected in cascade, each, except the first, being actuated in accordance with a predetermined combination of characters in said storage register and actuation of a preceding bistable circuit.

17. An automatic typeset machine control for use in printing telephone directory listings, each listing having a plurality of sections, comprising: a source of input signals representative of the characters in said listing, said signals representing characters of a single type and being divided into a plurality of groups corresponding with a listing initiation signal serial number, first space, name section, designation indicator, designaton, second space, address section, third space and telephone number of a listing; a multiple section character storage register for storing a plurality of sequential input signal character representative signals; a sequence control comprising a series of cascade connected bistable circuits corresponding with the serial number, first space, name section, designation, address and telephone number of said listing, each bistable circuit having an input and an output; a gate circuit responsive to a listing initiation signal and a serial number to actuate said serial number bistable circuit; a gate circuit responsive to actuation of the serial number bistable circuit and a space in said storage register to actuate said first space bistable circuit; a gate circuit responsive to said space representing bistable circuit and an alphabetic character in said storage register to actuate said name section bistable circuit; a gate circuit responsive to actuation of said name section bistable circuit, and the designation indicator in said storage register to actuate said designation bistable circuit; gate circuit means responsive to the space preceding said address section and to actuation of one of said name section and designation bistable circuits to actuate the address bistable circuit; and gate circuit means responsive to actuation of the address bistable circuit and the third space in said storage register to actuate said telephone number bistable circuit.

18. The machine control of claim 17 including means responsive to a signal representing the end of a listing for resetting said bistable circuits.

19. An automatic typeset machine control for use in printing directory listings, comprising: a source of input signals representative of characters in said listing; a first circuit responsive to said input signals for deriving control information therefrom; a second circuit responsive to said input signals for translating the input signals in accordance with said control information; a storage register for the control information from said first circuit; and means responsive to a condition of each circuit for controlling the operation of both circuits and the transfer of information through said storage register.

20. The control of claim 19 wherein said input signals are in the form of a continuous tape, and said first and second circuits are readers arranged to scan said tape sequentially with a spacing of at least one listing between the readers, said storage register having a number of sections corresponding with the number of listings between said readers, said control coordinating the action of said readers to keep said storage register filled and to program said second reader in accordance with the control information derived by the first reader from the information being processed by the second reader.

21. An automatic typeset machine control for use in printing directory listings, each listing having a plurality of sections, comprising: a source of input signals representative of characters in said listing, said signals being divided into a plurality of groups corresponding with the sections of said listing; a first circuit responsive to said input signals for deriving control information therefrom; a second circuit responsive to said input signals for translating the input signals in accordance with said control information; a plurality of storage registers for the control information from said first circuit; a sequential control for each reader having means responsive to the grouping of the character representative signals for generating control signals; and means responsive to said control signals from each circuit for controlling the operation of both circuits and the transfer of information through said storage register.

22. The control of claim 21 wherein said reader condition responsive means comprises a counter responsive to signals corresponding with each listing scanned by said readers, said counter being pulsed in one sense by listing signals from one reader and in the other sense by listing signals from the other reader, and a plurality of gate circuits responsive to the output of said counter, one gate circuit for each reader and one for shifting information through said storage register.

References Cited
UNITED STATES PATENTS

| | | | |
|---|---|---|---|
| 2,549,796 | 4/1951 | Frost | 178—26 |
| 2,750,446 | 6/1956 | Martin | 178—26.5 |
| 2,857,459 | 10/1958 | Goetz | 178—17 |

NEIL C. READ, *Primary Examiner.*

T. A. ROBINSON, *Assistant Examiner.*